(12) United States Patent
Ruiz et al.

(10) Patent No.: US 8,051,163 B2
(45) Date of Patent: Nov. 1, 2011

(54) SYNTHETIC TRANSACTIONS BASED ON SYSTEM HISTORY AND LOAD

(75) Inventors: Jon Ruiz, Eagan, MN (US); Ling Thio, Sunnyvale, CA (US); Brian Zuzga, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 1129 days.

(21) Appl. No.: 11/565,430

(22) Filed: Nov. 30, 2006

(65) Prior Publication Data

US 2007/0266148 A1 Nov. 15, 2007

Related U.S. Application Data

(60) Provisional application No. 60/799,607, filed on May 11, 2006.

(51) Int. Cl.
*G06F 15/173* (2006.01)
(52) U.S. Cl. ............. 709/224; 709/223; 709/225; 714/4
(58) Field of Classification Search .................. 709/224, 709/204, 225, 223
See application file for complete search history.

(56) References Cited

U.S. PATENT DOCUMENTS

| | | | |
|---|---|---|---|
| 6,564,342 B2 | 5/2003 | Landan | |
| 6,578,077 B1 * | 6/2003 | Rakoshitz et al. | ............ 709/224 |
| 6,584,501 B1 | 6/2003 | Cartsonis et al. | |
| 6,792,460 B2 | 9/2004 | Oulu et al. | |
| 7,478,151 B1 | 1/2009 | Maiocco et al. | |
| 2002/0198984 A1 | 12/2002 | Goldstein et al. | |
| 2002/0198985 A1 | 12/2002 | Fraenkel et al. | |
| 2003/0055892 A1 * | 3/2003 | Huitema et al. | ............. 709/204 |
| 2003/0128692 A1 * | 7/2003 | Mitsumori et al. | ........... 370/352 |
| 2004/0059544 A1 * | 3/2004 | Smocha et al. | ............. 702/182 |
| 2004/0122942 A1 | 6/2004 | Green et al. | |
| 2004/0172466 A1 | 9/2004 | Douglas et al. | |
| 2004/0215768 A1 * | 10/2004 | Oulu et al. | .................. 709/224 |
| 2005/0188221 A1 | 8/2005 | Motsinger et al. | |
| 2005/0216585 A1 | 9/2005 | Todorova et al. | |
| 2006/0106866 A1 | 5/2006 | Green et al. | |
| 2006/0184667 A1 | 8/2006 | Clubb et al. | |
| 2007/0195700 A1 * | 8/2007 | Katoh et al. | .................. 370/235 |
| 2007/0204034 A1 * | 8/2007 | Rexroad et al. | ............... 709/224 |
| 2007/0266149 A1 | 11/2007 | Cobb et al. | |

* cited by examiner

*Primary Examiner* — Moustafa M Meky
*Assistant Examiner* — Sahera Halim
(74) *Attorney, Agent, or Firm* — Vierra Magen Marcus & DeNiro LLP

(57) ABSTRACT

Synthetic transactions for a network system are generated based on monitoring of the network system. One or more network system monitoring systems receive network system traffic, traffic monitoring data and/or application runtime data during a monitoring process. The traffic monitoring data may be derived from network system traffic and the application runtime data may be data associated with application transactions. The traffic, traffic monitoring data and application runtime data may contain information regarding the scope and frequency of the functionality tested by the actual traffic received by the network system. Synthetic transactions may be generated and transmitted to test the network system based on the scope and frequency of the functionality tested by actual traffic.

35 Claims, 26 Drawing Sheets

| Functional Area/Transactn | URL | Backend | Agitator No. | WS | Targets AS | DB |
|---|---|---|---|---|---|---|
| Stock buy | www.example.com/stockbuy | DB A, AS A | 1 | 1000 Tx/min | 1000 Tx/min | 0 Tx/min |
| Shop Cart | www.example.com/shopcart | DB B, AS B | 2 | 10 Tx/min | 10 Tx/min | 10 Tx/min |
| Home | www.example.com/home | n/a | 3 | 1000 Tx/min | 0 Tx/min | 0 Tx/min |

Figure 19

SYNTHETIC TRANSACTIONS BASED ON SYSTEM HISTORY AND LOAD

CLAIM OF PRIORITY

This application claims the benefit of commonly assigned co-pending U.S. provisional patent application No. 60/799,607, filed May 11, 2006, titled "Traffic and Infrastructure Monitoring System".

BACKGROUND

The growing presence of the Internet as well as other computer networks such as intranets and extranets has brought many new applications in e-commerce and other areas. Organizations increasingly rely on such applications to carry out their business or other objectives, and devote considerable resources to ensuring that the applications perform as expected. To this end, various application management techniques have been developed.

One application management technique involves monitoring application performance using synthetic transactions. A synthetic transaction is a transaction sent to a web service system from a robot or other source besides a real user. Synthetic transactions may be used to test load, functionality, performance and other aspects of a web service; synthetic transactions are not provided to utilize web service functionality as done by real user requests.

Synthetic transactions may be generated and sent to a web service to create a load on the web service. The response of the web service to the load created can then be monitored. In some cases, synthetic transactions are used on production applications to periodically test whether the applications are available and behaving as expected.

Use of synthetic transactions can be problematic because of the limited coverage provided and the size of the load they create. Most moderately sized applications are capable of performing a large number of transactions. Each application transaction performs specific a function for the application. Application functionality should be tested frequently to ensure timely discovery of problems. Frequent usage of synthetic transactions combined with broad coverage of the transactions to cover application functionality can create significant load on and affect performance of a web service and its applications. Also, certain application functionality are prohibited from being performed by a non-real user (for example the execution of a real stock trade). Additionally, if a monitored application is already under high load, creating additional load on the web service or application with synthetic transactions only worsens this problem.

SUMMARY

Synthetic transactions can be generated based on monitoring a network system which processes the transactions. For example, the synthetic transactions may be used with a monitoring system that observes network traffic and/or generates application runtime data in response to monitoring one or more applications. Network traffic may be received by a front end network server or sent between internal servers, machines or other devices of the network system. Application runtime data may be created, managed or otherwise handled by an application on an application server or other server of the network system. The application runtime data identifies components of an application which are executed. Synthetic transactions may be generated and transmitted to test the network system in response to processing the network traffic and application runtime data.

In some embodiments, the scope and/or frequency with which synthetic transactions are generated and sent to a monitored system is determined in response to the actual network traffic received, processed and sent by a network system. The actual traffic, e.g., traffic which is not synthetically generated, may be monitored along with the application runtime data which is generated from processing the actual traffic. The actual traffic and application runtime data can reveal information regarding a functionality of an application tested by the actual traffic. From this functionality information, network system functionality may be identified which has not previously been tested or not tested at a desired frequency. Synthetic transactions can then be generated and sent to the network system to test desired application functions.

The monitored traffic and application runtime data may also indicate the current traffic load experienced by a monitored server or the network system as a whole. After determining the current traffic load, the monitoring system may determine an appropriate level of synthetic traffic which can be sent to the network system. For example, the more actual traffic received by the network system, the fewer synthetic transactions may be sent to the system.

In some embodiments, the current health and/or network system blindness may also be monitored. The current health of a web system, for instance, may be determined by monitoring the network system traffic and the network system itself. Activity or non-activity of the network system traffic and system servers may be compared to the expected activity for the servers and traffic to determine network system health. Blindness may be identified by confirming that synthetic traffic is sent to a network system but that the system server(s) do not receive and process the synthetic traffic. Similarly, certain types of network traffic may require processing by multiple network system servers. If such traffic is received by a first server and the corresponding processing requests are not received by the other servers required to process the traffic, the network system may not be performing correctly (i.e., the system may be in poor health). By sending synthetic transactions to the network system during periods of low or no activity, a monitoring system may help determine whether the network system is processing requests properly and performing properly.

In one embodiment, generating synthetic transactions may begin with receiving actual traffic for a network system. The network system functionality tested by the actual traffic current load experienced by the network system is then determined. Synthetic transactions are then generated based on the tested functionality and the current load.

In some embodiments, synthetic transactions and synthetic transaction instructions can be generated from traffic monitoring data and application runtime data. In this case, traffic monitoring data derived from actual traffic experienced for a network system and application runtime data for an application processing the actual traffic are received. Synthetic transactions and/or synthetic transaction instructions based on the traffic monitoring data and the application runtime data are then generated.

Some embodiments may generate synthetic transactions and synthetic transaction instructions based on comparing network system data and the network system load. In this embodiment, a network system functionality tested by actual traffic received by a network system and the load received by the network system are determined. The scope of network system functionality tested by actual traffic is compared to target network system functionality metrics. Synthetic transaction instructions are then generated based on results of the comparison and the network system load.

In some embodiments, network system blindness may be identified and tested using synthetic transactions. This may include determining that an application or a specific function within an application within an application server is not processing traffic received by the application server. A further determination may be made that a web server in communication with the application server and within a network system is not receiving traffic that requires application processing. A synthetic transaction instruction can then be generated in response to determining that an application within an application server is not processing traffic and a web server within a network system is not receiving traffic.

In some embodiments, synthetic transactions may be generated by sharing data between two monitoring systems. In this case, traffic monitoring data is received by a traffic monitoring system. The traffic monitoring data is associated with traffic received by a network system. Application runtime data associated with an application within the network system is received by an application monitoring system. The traffic monitoring data and the application runtime data is then processed by one of the traffic monitoring system and the application monitoring system. Finally, one or more synthetic transactions are generated in response to the processing of the traffic monitoring data and the application runtime data.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 13 is a flowchart of an embodiment of a process for providing traffic monitoring data and corresponding application runtime data to a user through an application monitoring system.

FIG. 19 is an example of target scope and frequency values for web service transactions.

DETAILED DESCRIPTION

Figure 1A:
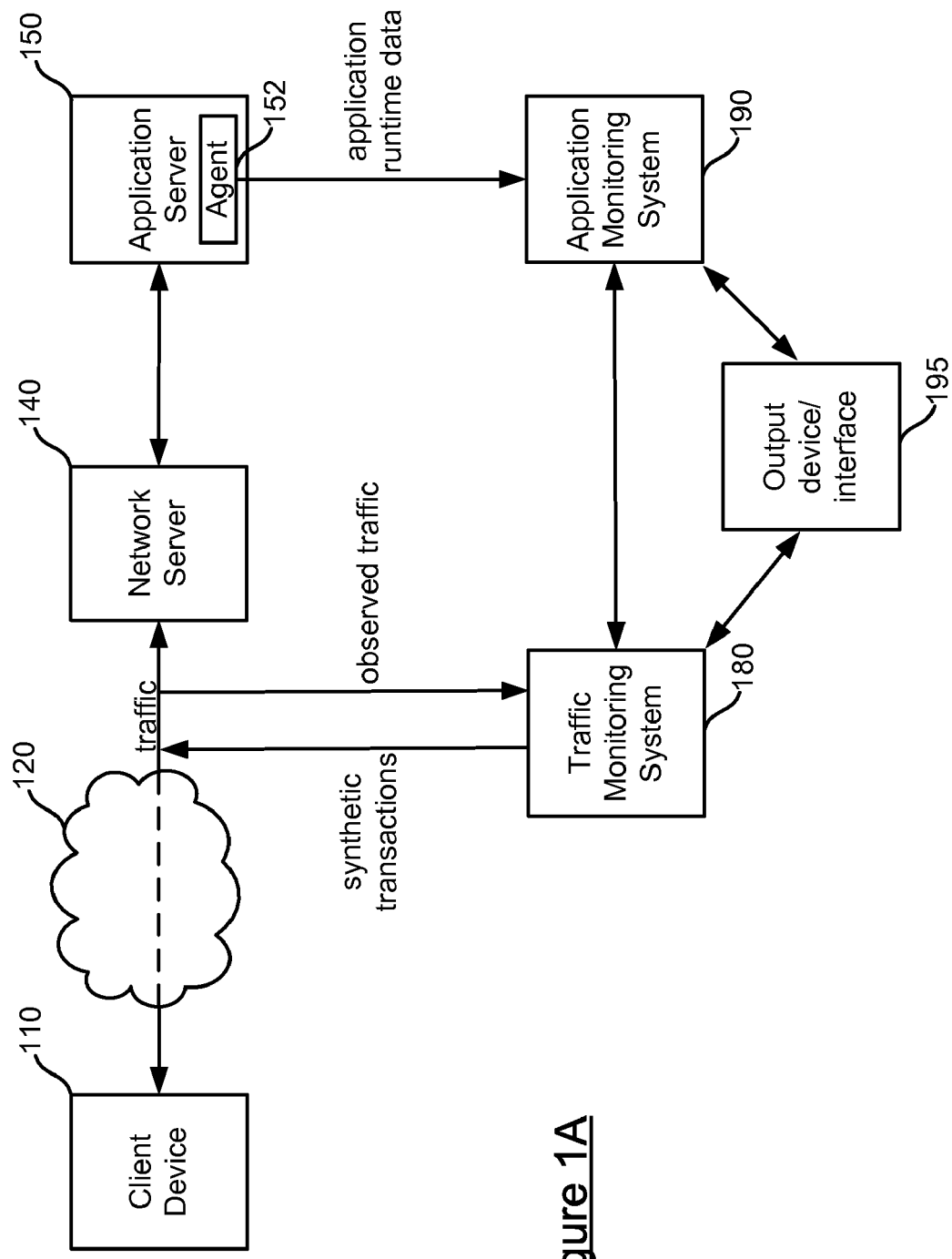
FIG. 1A is a block diagram of an embodiment of a network monitoring system which monitors a network service.

Synthetic transactions for a network system are generated based on monitoring the network system. One or more monitoring systems may observe network traffic and/or generate application runtime data during the monitoring process. In one embodiment, traffic monitoring data may be derived from the observed network traffic received by a front-end web server or between servers or machines internal to the network system. The generated application runtime data may be created, managed or otherwise handled by an application monitoring system residing on an application server or other server of the network system. Synthetic transactions may be generated and transmitted to test the network system and in response to the observed traffic monitoring data and application runtime data.

In some embodiments, the scope and/or frequency of synthetic transactions is determined in response to the actual traffic received and processed by the network system. A traffic monitoring system may monitor the actual network traffic for the network system, while the application monitoring system may monitor the performance of one or more applications and generate application runtime data. The monitored traffic and application runtime data may indicate the functionality tested by the actual network traffic. Additionally, the monitoring systems may determine the frequency with which the network system functionality is tested by the actual network traffic. From this scope and frequency information for the real network traffic, functionality may be identified which has not previously been tested or not tested at a desired frequency. Synthetic transactions can then be generated to test the application functions that should be tested.

The traffic monitoring data and application runtime data may also indicate the current traffic load experienced by a monitored server or system, such as a network system. After determining the current traffic load, the traffic monitoring system may determine an appropriate level of synthetic traffic for the network system. For example, as the level of actual traffic received by a network system increases, it may be desirable to reduce the level of synthetic transactions sent and corresponding additional load placed on the network system.

In some embodiments, network system health and/or blindness may be determined by a monitoring system. The current health of a web system may be determined by monitoring the web system at more than one point. For example, a monitor system may detect that a front end server receives a request that requires the front-end server to access an application server. If the monitor system does not detect a corresponding request from the web server for the application server within an appropriate amount of time, the system may determine that the front end web server may not be functioning properly. Thus, activity or non-activity of the monitored server may be compared to the expected activity to determine server health. Blindness may be identified by testing one or more servers during periods of low activity. Testing the servers during low activity periods may help to determine whether the servers are processing requests properly (in which case the low activity period is due to low activity) or not functioning properly (in which case the low activity is due to a server not processing requests properly). In any case, synthetic transactions may be generated and sent to confirm that a web server is working properly and to confirm whether a web service or particular server is experiencing low activity or is blind to requests it is receiving.

Network Service Monitoring

The present technology may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

The network service monitoring system may include multiple monitoring systems such as, in one embodiment, a traffic monitoring system and an application monitoring system. The traffic monitoring system may observe network traffic sent and received by a network service, may have a variety of architectures and may monitor traffic provided according to any type of network protocol. The observed traffic may be processed as discussed in more detail below to provide traffic monitoring data. An example network monitoring system is discussed below in connection with FIG. 1A. Logical operation of a traffic monitoring system is discussed below with respect to FIG. 1B.

In some embodiments, a synthetic transaction generating system may be implemented as a separate system from the network monitoring system. Thus, a synthetic transaction generating system may reside one the client side of the network illustrated in FIG. 1A.

The application monitoring system may monitor the execution of one or more applications of the network service. For example, the application monitoring system may monitor the performance of one or more applications and/or application components and generate corresponding application runtime data which identifies, e.g., components which are invoked in one or more execution paths such as threads and/or processes of the application. For example, the components can include servlets, Java Server Pages, Enterprise Java Beans Java Database Connectivity components and/or Microsoft .NET components. The application runtime data can provide a transaction trace, for example, which indicates the time intervals in which the components were invoked. Logical operation of an application monitoring system is discussed in more detail below with respect to FIG. 1C.

Processing observed traffic and application runtime data may include associating the two types of data so that related traffic monitoring data and application runtime data can be correlated and selectively accessed. In this way, an operator can quickly navigate through the data to obtain relevant information, such as information for diagnosing an anomalous condition.

Thus, an operator may obtain information regarding network service performance "from the outside" by viewing the observed traffic (e.g., from the perspective of a client interacting with the network service) as well as "from the inside" (e.g., from the perspective of the execution of components of the application). By viewing a network service from the inside and outside, the operator has more information from which to monitor, manage and diagnose the performance and health of a network service.

For example, the traffic monitoring data can characterize a user's interaction with an application from the user's perspective, that is, by answering the question: "What is the impact of the application on the user?" The application runtime data can characterize the application from a perspective of individual software components that are invoked in the application. Such component level data allows a programmer or other specialists to diagnose a problem and implement a fix, e.g., by patching or otherwise revising the application, repairing or replacing hardware, reallocating resources, etc. The traffic monitoring data and application runtime data can also be used separately, in a non-integrated manner. Generally, the application runtime data focuses on diagnosis of a problem, e.g., finding the root cause of a problem, while the traffic monitoring data focuses on user impact.

Further, traffic monitoring data and application runtime data can be classified according to one or more hierarchies which characterize client interactions with an application. For instance, a hierarchy may characterize the interactions according to a business model for an e-commerce application. This allows the traffic monitoring data and application runtime data to be presented in a user-friendly manner which is tailored to the needs of a particular organization and individuals in the organization.

FIG. 1A is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such a server. Application server 150 processes the request received from the network server 140 and sends a corresponding response to the client device 110 via the network server 140.

The network monitoring system also includes traffic monitoring system 180 and an application monitoring system 190. In one possible approach, the application monitoring system uses one or more agents, such as agent 152, which is considered part of the application monitoring system 190, though it is illustrated as a separate block in FIG. 1A. Traffic monitoring system 180 observes traffic sent between client device 110 and network server 140, including requests sent from client device 110 and corresponding responses received by the client device 110. Agent 152 and application monitoring system 190 monitor the execution of one or more applications at the application server 150, generate application runtime data, which represents the execution of components of the application responsive to the requests, and process the generated application runtime data. In some embodiments, application monitoring system 190 may be used to monitor the execution of an application or other code at some other server, such as network server 140. An output device/interface 195 may communicate with the traffic monitoring system 180 and the application monitoring system 190 for presenting reports and other data to an operator and for receiving inputs from the operator. The traffic monitoring system 180 and the application monitoring system 190 may have independent interfaces or may share a common interface.

Figure 1B:
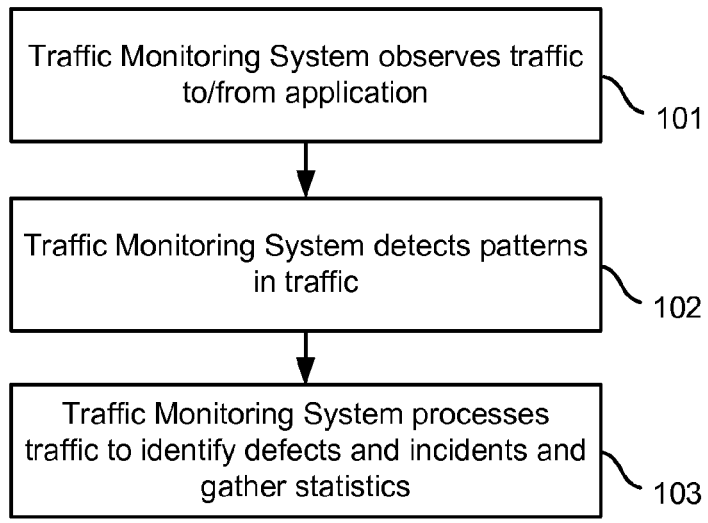
FIG. 1B illustrates a flowchart of an embodiment of a process by which a traffic monitoring system monitors traffic.

FIG. 1B illustrates a flowchart of an embodiment of a process by which traffic monitoring system 180 of FIG. 1A monitors traffic. Note that in this and the other flowcharts provided, the steps indicated are not necessarily performed one at a time in the order indicated, but may occur simultaneously, at least in part, and/or in another order. Traffic sent to and from an application, such as traffic sent between client device 110 and web server 140 over network 120, for instance, is observed by traffic monitoring system 180 at step 101. The observation can involve passively copying the traffic at some intermediate point between the client and the application via a tap or mirror port, for instance, or intercepting the traffic, copying the intercepted traffic and relaying the intercepted traffic it to its intended destination.

At step 102, the traffic monitoring system 180 detects patterns in the traffic and may use this information to group traffic into an object hierarchy. For example, this can involve recognizing application requests and responses, relating or binding corresponding request-response pairs into transaction components (for example an HTML file or an image file), binding transaction components into transactions (for example a web page with an HTML file and zero or more image files), binding transactions into user-specific tasks that may be called business transactions (for example an application's login business transaction may retrieves one or more web pages). Similarly, business transactions can be bound to a business process, and business processes can be bound to a domain. The domain, business processes, business transactions, transactions and transaction components may be part of one or more hierarchies which are defined for classifying the observed traffic. A business process includes one or more business transactions, and a domain includes one or more business processes.

Also, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used with a session identifier, where only transactions or transaction components sharing a common session identifier may be bound together. Further related information can be found in U.S. patent app. publication no. 2003/0191989 to P. O'Sullivan, published Oct. 9, 2003, titled "Methods, systems and computer program products for triggered data collection and correlation of status and/or state in distributed data processing systems," and incorporated herein by reference.

Transactions can be detected based on transaction definitions which specify the existence or non-existence or combination thereof of a set of name/value pairs, e.g., parameters, which are found in the traffic. For example, parameter specification may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Session managers, such as the eTrust® SiteMinder available from CA, Inc., Islandia, N.Y. uses a cookie parameter to hold an encoded or encrypted value, which in turn holds session specific name/value pairs. Session parameters include name/value pairs that appear in such an encoded or encrypted value. Name and value specifications may specify an exact value for exact matching or a pattern for pattern matching. Any form of pattern matching may be used, from simple wild-card pattern matching to more complex regular expression pattern matching.

In particular, an operator can define a hierarchy for organizing the traffic monitoring data which is obtained by the traffic monitoring system, e.g., through an interface or other means. For example, an operator may use an interface to generate the hierarchy from a set of parameters obtained from the observed traffic. The parameters can be designated as belonging to one or more levels of the hierarchy as discussed in more detail below with respect to FIG. 3 and FIG. 10B. In this manner, traffic monitoring data can be accessed according to the classification provided by the hierarchy to facilitate diagnosis of anomalies and understanding of application and network performance.

At step 103, the traffic monitoring system processes the traffic to identify defects and incidents and gather statistics. A defect generally indicates an anomalous condition of a request-response pair. Moreover, an incident can be set when one or more related defects are set. An incident may be a cause for concern which should be analyzed further. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may be sufficient to set an incident.

In one approach, defects can be detected by evaluating a request-response pair against defect criteria which may specify transaction types, a range of acceptable response times, and/or other parameters, for instance. For example, when the defect criteria specifies a range of acceptable response times within which a response may be received after a request is sent, the request-response pair is defective if the response time falls outside the specified range. Similarly, when the defect criteria specify a range of unacceptable response times, the request-response pair is defective if the response time falls within the specified range. Moreover, defect criteria can be specified for transaction components, transactions and/or business transactions.

Furthermore, defect data and statistics can be aggregated for a number of request-response pairs and classified according to the hierarchy. The aggregated statistics and defects can then be processed to enable other functionality of the present technology and stored for access by an operator through an interface or other appropriate output.

Figure 1C:
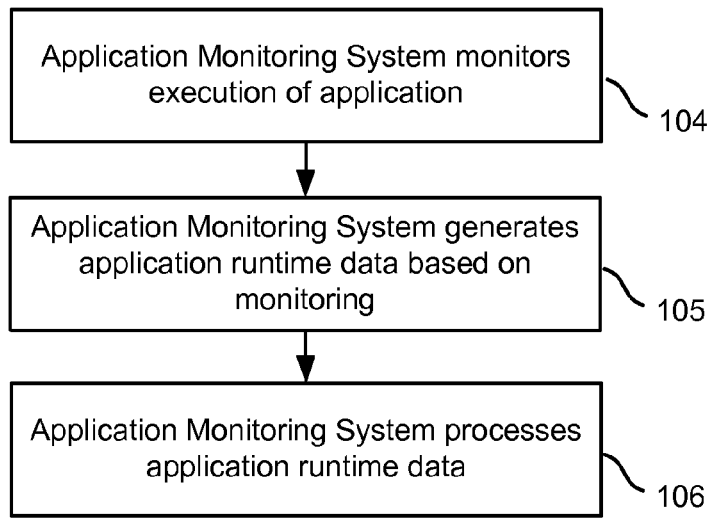
FIG. 1C illustrates a flowchart of an embodiment of a process by which an application monitoring system monitors an application.

FIG. 1C illustrates a flowchart of an embodiment of a process by which the application monitoring system 190 of FIG. 1A monitors an application. An application is monitored by application monitoring system 190 at step 104. Monitoring may involve agent 152 determining which components of application server 150 are invoked and the duration in which they are invoked when the application processes a client request, as discussed in more detail below with respect to FIG. 4 and FIG. 11.

Application runtime data based on the monitoring of the application is generated at step 105. The generated application runtime data can indicate the application components involved in processing a request, the duration that each component consumed in processing a request, and other information. The application runtime data can be generated by agent 152, in one possible approach, after which the agent 152 may forward the generated application runtime data to application monitoring system 190, which can exist outside of application server 150, in one embodiment. Generating and reporting application runtime data is discussed in more detail below with respect to FIG. 4 and FIG. 11.

The application runtime data is processed by application monitoring system 190 at step 106 such as by aggregating the data, storing the data, and providing the data to an operator through an interface or other output.

Further, traffic monitoring system 180 and application monitoring system 190 may communicate with each other to enable association of the traffic monitoring data and application runtime data. The association allows an operator to access information which characterizes the network service from the "outside" via the traffic monitoring data and from the "inside" of the network service via the application runtime data. This provides the operator with a powerful insight into how a network service processes requests (the inside perspective) and the effect of the network service on a customer or other user or network component (the outside perspective).

In some embodiments, the traffic and application monitoring systems may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance.

In one embodiment, integrating the data allows business information associated with a number of web service requests and corresponding responses to be associated with application runtime data. For example, consider a number of requests received daily by a web service of a bank to open new user accounts. The integrated traffic monitoring and application runtime data may provide aggregated information regarding the content of the requests and responses and timing information (e.g., response times) for the transactions from the requesting users' point of view, as well as detailed information regarding the execution of the application such as information regarding application components which are invoked and timing information regarding how the requests were processed and the responses were generated. Generally, application runtime data can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. The traffic monitoring data and application runtime data can be aggregated over many requests and responses to obtain valuable trend information without the need to save data for each specific request and response. However, traffic monitoring data and application runtime data for a specific request and response can be saved, e.g., if an anomalous condition is detected, to allow a detailed analysis of a specific request-response pair on an as-needed basis. The integrated data may be accessed through the traffic monitoring system, the application monitoring system or some other system, and/or provided to another system, device or program code for further processing.

Below, an architecture for a traffic monitoring system and application monitoring system is discussed generally and then in more detail with respect to FIGS. 1D-5. Operation of the monitoring systems is discussed with respect to FIGS. 6-11. Exemplary methods of integrating traffic monitoring data and application runtime data are discussed with respect to FIGS. 12A-13.

Figure 1D:
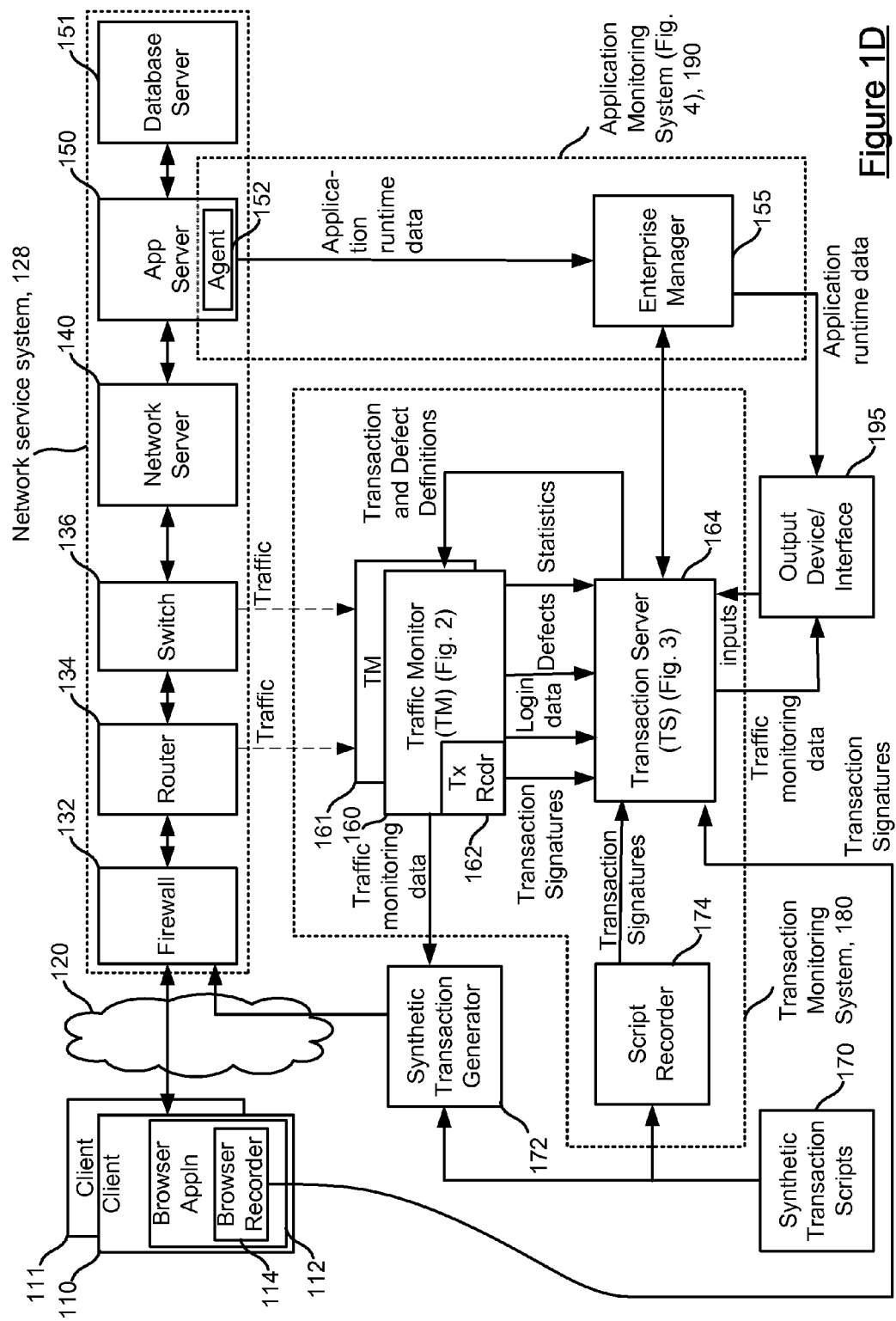
FIG. 1D is a block diagram of an embodiment of a system for monitoring a network service.

FIG. 1D is a block diagram of an embodiment of a system for monitoring a network service. A network service system 128, traffic monitoring system 180, and application monitoring system 190 are provided. The network service system 128 includes firewall 132, router 134, switch 136, network server 140, application server 150 and database server 151. Client 110 may send requests to and receive responses from the network service system over one or more networks such as network 120. Traffic monitoring system 180 collects data regarding network service system traffic and application monitoring system 190 collects data regarding execution of the application at the application server 150.

In the embodiment illustrated, client 110 includes browser application 112, which may be implemented, e.g., as a web browser or other network browser. In some embodiments, browser application 112 may include browser recorder 114 which records browser requests, headers and content data received from network server 140, translates the browser content data into transaction signatures, and transmits the signatures to transaction server 164. Transactions signatures and recorders are discussed in more detail below. In some embodiments, more than one client, as illustrated by additional client 111, may communicate with network server 140 to send traffic to and receive traffic from network server 140. In some embodiments, a client can be a server computer or other computer. In this case, requests need not originate from a browser or as a result of human interaction. In any case, the recorder 114 can record requests, headers and content for the client device.

Traffic sent over network 120 from client 110 may pass through firewall 132, router 134 and switch 136 before reaching network server 140, in one possible network topology. In practice, more complex or less complex topologies may be used. Firewall 132 may be implemented as a set of one or more related programs located on a network gateway server that protects the resources of the servers and devices inside a private network. Incoming traffic received by firewall 132 can be analyzed to determine if it is safe before it is sent toward network server 140.

Router 134 may be implemented as a device or software within a device and can be connected to more than one other device. Router 134 determines the next network point or device to which an information packet should be forwarded based on its understanding of the state of the network or networks to which it is connected. Switch 136 channels incoming data from any of multiple input ports to the specific output port that will take the data towards its intended destination, e.g., based on an Internet Protocol or IP address in each received packet.

Traffic sent by client 110 is received by network server 140 and may be processed by network server 140. Network server 140 may optionally send requests to one or more other servers to process the received traffic, such as application server 150, database server 151 or other backend servers (not illustrated in FIG. 1D). In response to a request received from browser application 112, network server 140 provides a response with web page content, for instance, to browser application 112. Network server 140 is in communication with client 110 (through devices 132-136) and with application server 150. Application server 150, which can include one or more application programs that provide business logic, for instance, is in communication with network server 140 and database server 151. Database server 151 is in communication with application server 150 and stores network service system information and other information for responding to client requests. The stored information is configured to be accessed, managed and updated by application server 150 and other devices and/or programs.

The network service system processes a request received from client 110 such as by sending the request to application server 150 which, in turn, generates a response and provides it to network server 140. In some cases, application server 150 may access database server 151 or some other backend server to process the request. Network server 140 transmits the response to the client 110 through switch 136, router 134, firewall 132 and network 120.

Traffic monitoring system 180 may monitor the traffic associated with the request and corresponding response at any desired location such as between client 110 and network server 140. Traffic monitoring system 180 includes traffic monitor (TM) 160, transaction server (TS) 164, script recorder 174, and browser recorder 114. In some embodiments, there may be more than one traffic monitor, as illustrated by additional traffic monitor 161. In one approach, each traffic monitor can monitor a different server, such as a web server or application server. Moreover, the monitoring duties may be divided among multiple monitors according to different ranges of network addresses. One or more traffic monitors may report information to transaction server 164. Thus, one transaction server may receive information from more than one traffic monitor, in one approach.

Traffic monitor 160 observes the traffic and can perform tasks such as determining whether portions of the traffic qualify as a defect, identifying user information in a transaction, and generating defects and statistics information. Traffic monitor 160 may observe the traffic at router 134, e.g., through a passive tap, at switch 136, e.g., via a mirror port, or some other point in the route traversed by the traffic. Traffic monitor 160 is described in more detail below with respect to FIG. 2.

Transaction server 164 receives login data, statistics and defects information from traffic monitor 160, receives transaction signatures from one or more recorders, generates transaction and defect definitions, provides the definitions to traffic monitor 160, and provides traffic monitoring data to an operator regarding the observed traffic. Transaction signatures provide information for transactions monitored by a particular recorder and are used by transaction server 164 to generate transaction definitions and defect definitions. Transaction server 164 provides the definitions to traffic monitor 160 for use in detecting transactions and determining whether they are defective. The transaction data may be provided to an operator through an output device/interface 195 to allow the operator to view reports with traffic monitoring data and application runtime data, generate and modify transaction and defect definitions, and perform other tasks. Transaction server 164 is discussed in more detail below with respect to FIG. 3.

The transaction signatures received by transaction server 164 can be sent by one or more transaction recorders. A transaction signature is a set of data that describes a particular transaction. In one embodiment, a transaction includes one or more request-response pairs. For example, a transaction may include a request by a client browser application for a login page from a web service system, and the corresponding response from the system that includes the login page content to be rendered by the client browser. The transaction signature that describes the transaction may include the request header data, request body data, the user data contained in the request, a request identifier, the source of the request, the recipient of the request, and corresponding information in the response (e.g., header, body, source of response, intended recipient).

An operator may use an interface to generate transaction definitions from transaction signatures, e.g., by viewing transaction signature data through the interface, modify the transaction signature data if desired, and selecting or "promoting" the transaction signature data to a transaction definition. The transaction definition may then be used to identify valid transactions in subsequently observed traffic. For example, assume a user "Bob" is logging on to a corporate intranet site to submit a form to the human resources department. Transaction definitions can be set which identify Bob's login transaction and the form submission transaction as two distinct transactions. Moreover, the promotion can also remove "Bob" as a specific user. Generating transaction definitions from transaction signatures is discussed in more detail below.

One or more recorder can be used to provide the transaction signatures by capturing transaction data (for example, a request observed at a client which generated the request or observed in network server system traffic), translating the transaction data into transaction signatures, and transmitting the signatures to transaction server 164. For example, a client request can be translated into a transaction signature by extracting identification parameters such as HTTP parameters (name/value pairs) from the request. Moreover, different types of recorders can be used, such as comprehensive recorders, standard recorders, and script recorders. A comprehensive recorder may be implemented on any machine, such as an administrator console or a machine which performs live transactions. For example, the transaction recorder (Tx Rcdr) 162 which is provided as part of the traffic monitor 160 may be considered to be a comprehensive recorder. A standard recorder may be implemented on the same machine which performs live transactions (such as within a browser). For example, the browser recorder 114 may be considered to be a standard recorder. Script recorders, such as script recorder 174, use pre-recorded network packet capture files and test script output files to create transaction signatures.

In one embodiment, transaction server 164 receives transaction signatures from browser recorder 114 within browser application 112, script recorder 174, and transaction recorder (Tx Rcdr) 162 within traffic monitor 160. Browser recorder 114 may be a standard recorder or a browser plug-in. The browser plug-in records a web page and page components as they are loaded into browser application 112. Browser recorder 114 then translates the page and page components into a transaction signature and transmits the transaction signature to transaction server 164. Transaction recorder 162 records transaction signatures from monitored traffic. Script recorder 174 may receive transaction scripts. A transaction script is a set of script commands that can be executed to perform one or more transactions at a client communicating with a network system. For example, a transaction script may include script commands to request a network service login page, and provide login user information in response to receiving the login page. In some embodiments, each script command may also include parameters and other data to complete each request. For example, a login request may include data for a user name and password. In some embodiments, the transaction scripts may be provided in a log file or some other script file. Script recorder 174 translates the transaction scripts into transaction signatures and transmits the signatures to transaction server 164. One example of a script recorder uses a script generated by "Mercury LoadRunner," software, available from Mercury Interactive Corporation, of Mountain View, Calif.

Transaction server 164 may also communicate and exchange information with Enterprise Manager 155 such as hierarchy information, statistics and defects information and other information, as discussed in more detail below.

Application monitoring system 190 may monitor execution of an application based on the traffic received by the application, generate application runtime data and process the generated data. As discussed above with respect to FIGS. 1A and 1C, application monitoring system 190 may include Enterprise Manager 155 and Agent 152 and is in communication with application server 150 and traffic monitoring system 180. Application monitoring system 190 is discussed in more detail below with respect to FIG. 4.

Output device/interface 195, which may include an on-screen interface, for instance, may receive traffic monitoring data from traffic monitoring system 180 and application runtime data from application monitoring system 190 for access by an operator. The interface 195 also allows the operator to provide inputs to the transaction server 164, e.g., to provide transaction definitions or other configuration settings.

Synthetic transaction generator 172 may generate synthetic transactions for network server 140, e.g., in response to receiving synthetic transaction scripts from synthetic transaction script module 170. The synthetic transaction scripts can also be received by script recorder 174, which records the scripts, translates the scripts into transaction signatures, and forwards the generated transaction signatures to transaction server 164. The synthetic transaction generator 172 may be provided as part of the traffic monitoring system or as a component that works with the traffic monitoring system and/or the application monitoring system. The synthetic transactions may be injected into the traffic received by network server 140. Generating synthetic transactions may begin with observing traffic for a network service, and determining the scope and frequency of the traffic, in particular, the scope of a network functionality tested by the observed traffic as well as the frequency with which the traffic scope is tested. Synthetic transactions may be generated to test network service functionality based on a comparison of actual traffic scope and/or frequency to target scope and/or frequency. For example, if a particular function of an application is not being tested frequently enough by the actual users of the network service, synthetic transactions can be generated to test the function. In some embodiments, the synthetic transactions may also be based on application runtime data which may be processed to determine the scope and frequency with which application components are tested by the observed network traffic.

Figure 2:
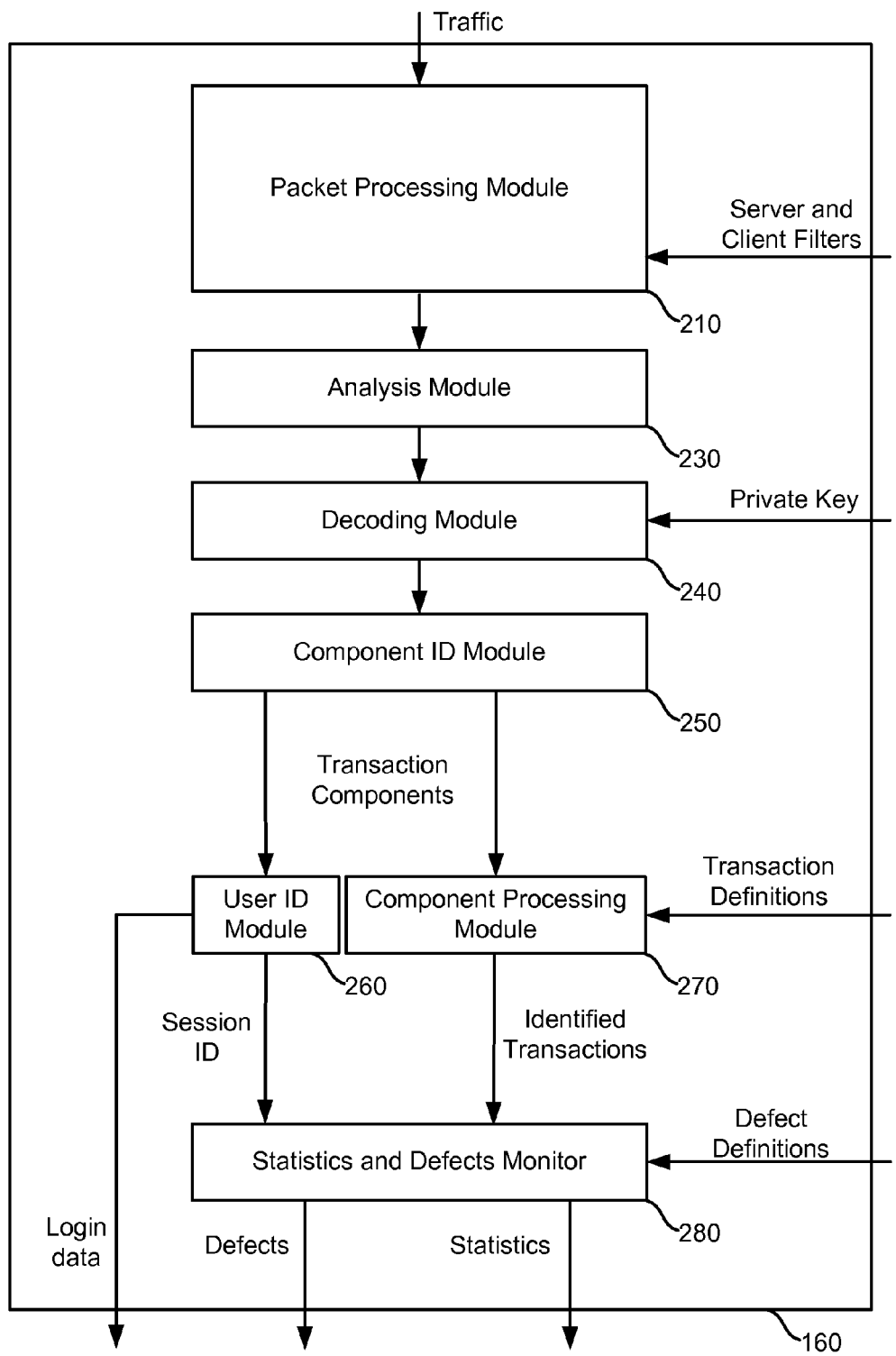
FIG. 2 is a block diagram of an embodiment of a system for processing network traffic.

FIG. 2 is a block diagram of an embodiment of a system for processing observed network traffic. In one embodiment, FIG. 2 provides detail of software modules for implementing the traffic monitor 160 of FIG. 1D. Operation of traffic monitor 160 is also discussed with respect to FIGS. 8 and 9.

As discussed above, traffic monitoring system 180 may be used to observe and process network traffic using any protocol, including but not limited to HTTP and HTTPS. Portions of the discussion below that reference HTTP and/or HTTPS, or any other protocol, are provided for purposes of example and should not be construed to limit application of the present technology.

Traffic monitor 160 includes packet processing module 210, analysis module 230, decoding module 240, component ID module 250, user ID module 260, component processing module 270 and statistics and defects monitor 280. Packet processing module 210 captures and filters traffic packets. In some embodiments, observing traffic may include receiving a copy of the traffic which is received by router 134, switch 136 or some other point in the path of traffic between client 110 and web server 140. In some embodiments, traffic may also be observed at a device existing between network server 140 and application server 150, or between application server 150 and database server 151. The observed traffic may be received as unordered packets of traffic provided according to HTTP, HTTPS or some other format. Packet processing module 210 may also receive one or more server and/or client filters for filtering the captured traffic as discussed in more detail below with respect to FIG. 8.

The analysis module 230 may reconstruct a data stream according to its format, e.g., TCP/IP, from filtered unordered packets received from packet processing module 210. The reconstructed data stream may include requests and responses. For example, request-response pairs can be detected in the data stream. A request-response pair can include a request provided by a client to an application and a corresponding response provided by the application to the client. For instance, the request can be a request for a component of a web page such as an image, a cascaded style sheet, or a JavaScript component.

Decoding module 240 decodes the reconstructed data stream provided by the analysis module when it is an encoded data stream. For example, a data stream may be encoded if it is generated from a stream of packets sent over a secure socket layer connection, e.g., using HTTPS or some other secure protocol. The decoding may be performed using a private key received or otherwise accessed by decoding module 240.

Component ID module 250 receives a reconstructed data stream from analysis module 230 (or decoding module 240 if the stream was encoded), identifies transaction components within the stream such as by identifying name/value pairs and provides the transaction components to a user ID module 260 and a component processing module 270. Further details regarding the component ID module 250 are provided below in connection with FIG. 8.

User identification (ID) module 260 receives the transaction components from component ID module 250 and identifies a session ID and/or user ID from the received components. In some embodiments, a user ID is derived from a login transaction as part of a business transaction. The user identification module 260 then provides the session ID and/or user ID to the statistics and defects monitor 280.

In one approach, a session identifier can be related to one or more transactions. For example, in a web application, the session ID is carried in the observed traffic as a cookie in every packet. The session ID in the packets related to the transaction may be related to the transaction itself. A single session identifier may be bound to one or more transactions. Session attributes, for example, session priority, may also be associated with transactions through this session-to-transaction binding mechanism.

Further, a user identity can be related to transactions. A user ID may be identified and associated with a session by examining and parsing a login transaction for user identity information, for example. In those cases where the login transaction possesses a session identifier, for example, this session ID may be used to establish a relationship between the user ID and the session ID, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user-to-session binding mechanism and through the user-to-session-to-transaction binding mechanism. User attributes may be retrieved from an external system, for example, by using user identity information to look up user attributes in an X.500 directory, a LDAP directory, and/or a single sign-on system.

Component processing module 270 receives the transaction components from component ID module 250 and processes them to identify associated transactions using transaction definitions received from transaction server 164. A transaction can refer to a series of related network communications that perform a function. For example, the retrieval of a web page may involve one or more transactions. Moreover, a transaction definition may indicate that a particular transaction component is a "primary" component of a particular transaction. In some cases, this can be the first transaction component in a set of transaction components that make up a transaction. The presence of the primary component indicates the presence of the associated transaction. The other transaction components in the definition of a transaction can be considered to be secondary components. For example, if a transaction component within a transaction has a key/value pair indicating an action of "login," then the transaction is a login transaction. The secondary components are also part of the login transaction. The use of primary components to identify transactions can improve efficiency but is not necessary.

The received components are compared to the transaction definitions to identify transactions to be further processed by the traffic monitoring system. Transactions are selected to be processed further if the components conform to one or more of the transaction definitions. In one embodiment, the comparison determines if the received components have a URL which matches a URL in the transaction definitions. The components which match the transaction definitions are combined into transactions and provided to statistics and defects monitor 280 to be processed further. The components that do not match any transaction definitions can be discarded, ignored, identified as "not classified," or otherwise processed.

In addition to identifying transactions based on transaction components, component processing module 270 can identify a business transaction which includes a set of associated transactions. Generally, different logical constructs of a hierarchy can be identified from the transaction components. At higher levels of the hierarchy, a business process which refers to a series of related business transactions, and a domain which refers to a series of related business processes, can be defined using corresponding definitions. A business process can include a set of associated business transactions which have a common session identification, for instance. To illustrate, a business process class for buying a book from an e-commerce web site can be defined. This business process class can include classes of business transactions such as login, shopping, add to cart and checkout. A particular use of the login process, for instance, by a particular user at a particular time represents an example of an instance of the login business transaction. The login business transaction instance may include transaction component instances which provide a user identifier (user ID), a URL for a login page, and a session identifier (session ID). The component processing module provides the identified transactions to the statistics and defects monitor 280.

Further, multiple business process hierarchies may be built on top of a single business transaction/transaction/transaction component hierarchy. Also, users may be part of a user group hierarchy. Users groups may be part of a higher level user group hierarchy. Multiple user group hierarchies may be built on top of the user identification.

Statistics and defects monitor 280 receives session ID data from user ID module 260, identified transactions (transactions that match a transaction definition) from component processing module 270 and defect definitions from transaction server 164. In one embodiment, the defect definitions define criteria for determining whether the behavior of a transaction is acceptable. For example, a defect definition may indicate an acceptable response time for a component, error responses that are allowed or not allowed in response to a request, and other transaction data components required for a transaction. The identified transactions are analyzed based on the defect definitions to generate defects and statistics data. Generally, transactions are defective when they fail to meet quality standards. Moreover, the quality standards may be set for different levels of the hierarchy such as the business transaction, transaction or transaction component levels, for instance. Behavioral defects result from the behavior of a transaction failing to meet specifications. Slow transaction time, fast transaction time, low throughput, and incomplete transactions are examples of different types of behavioral defects. Response defects result from the response of a transaction failing to meet specifications. HTTP response codes (for example, HTTP 500-599 errors), unauthorized access, content analysis defects, and missing response defects are examples of different types of response defects.

The defect data indicates the number of defects found in the identified transactions over time, the type of defect and the number of defect transactions for each particular defect type. The defects may be reported per defective transaction with session identification information. In one embodiment, any identified transactions that conform to the defect definitions are designated as defects. Statistics data may include the number of transactions which occur, the type of transaction (for example, by URL), and other data. The statistics may be reported per hour, per transaction definition, per user and per session identification, for instance. Statistics and defects monitor 280 can report statistics and defect data for the identified transactions to transaction server 164.

Figure 3:
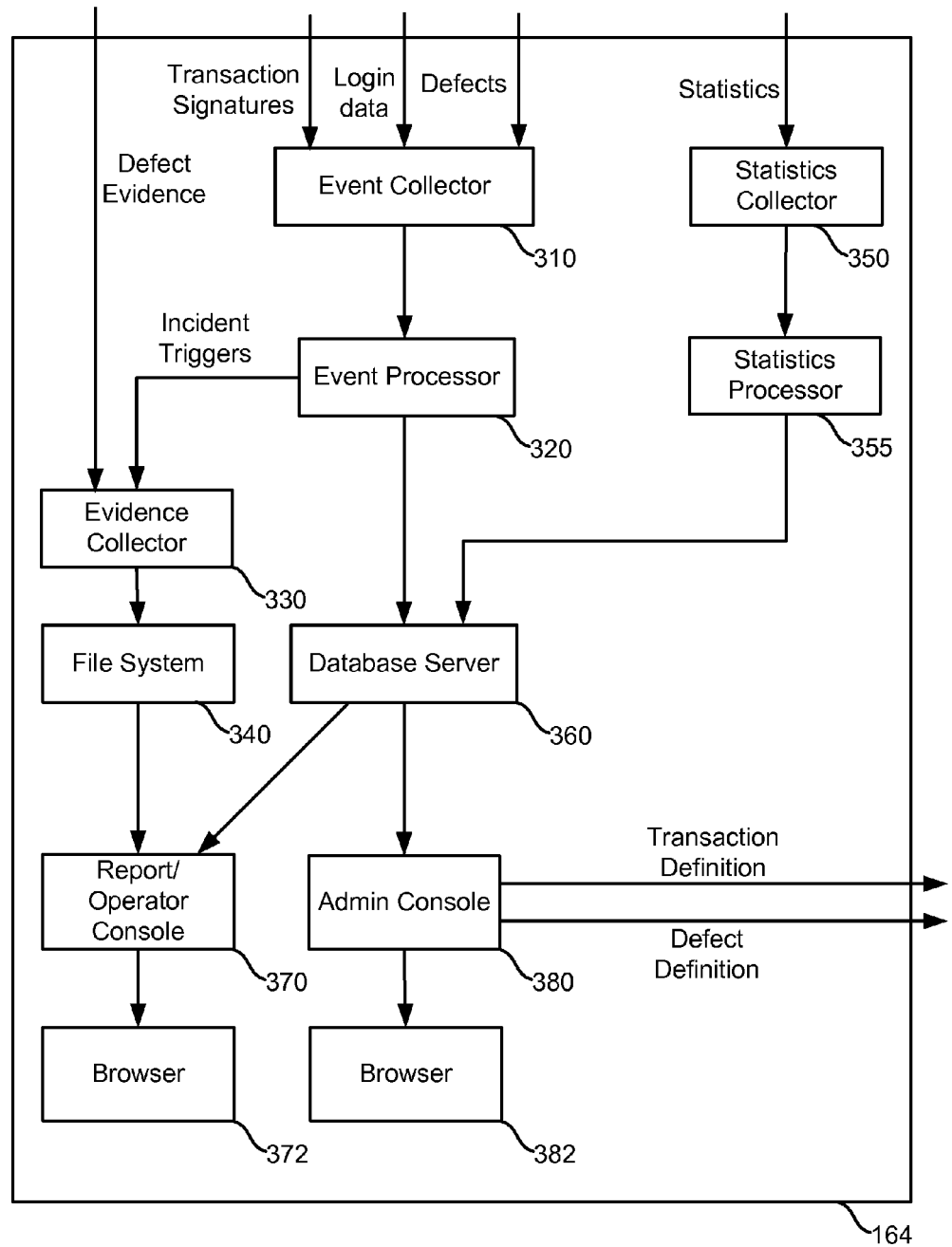
FIG. 3 is a block diagram of an embodiment of a system for receiving traffic information and generating traffic monitoring data.

FIG. 3 is a block diagram of an embodiment of a system for receiving transaction data and generating traffic monitoring data, e.g., transaction statistics, defect data, transaction definitions, and other data. In one embodiment, the system of FIG. 3 provides details regarding software modules for implementing transaction server 164 of FIG. 1D. Operation of transaction server 164 is discussed with respect to FIGS. 10A and 10B. Generally, transaction server 164 enables an operator to generate traffic classification logic, view traffic monitoring data reports, such as defect and incident reports, and provide transaction and defect definitions to traffic monitor 160.

Event collector 310, statistics collector 350, event processor 320, statistics processor 355, evidence collector 330, file system 340, database server 360, report/operator console 370, admin console 380, and browsers 372 and 382 are provided. Event collector 310 receives data including transaction signatures from recorders 114, 162, and 174 (FIG. 1D) and login data and defects from traffic monitor 160 as discussed above with respect to FIG. 2, and translates the received data into a format that can be processed by event processor 320. In one embodiment, event collector 310 generates objects, such as Java objects, from the received data and provides the objects to event processor 320. Event processor 320 processes the objects to provide database data to be stored at database server 360. In some embodiments, database server 360 may be implemented as an SQL database server. In one possible approach, the Java Database Connectivity (JDBC) API can be used for this purpose. JDBC enables Java programs to execute SQL statements to allow Java programs to interact with an SQL-compliant database.

Similarly, statistics collector 350 receives statistics data from traffic monitor 160, translates the received data into one or more objects, such as Java objects, and provides the generated objects to statistics processor 355. Statistics processor 355 processes the objects to provide database data to be stored at database server 360, again such as by using JDBC.

Event processor 320 may also generate incident triggers for use by evidence collector 330. An incident can be set when one or more related defects are set. An incident may be a cause for concern which should be analyzed further. An incident trigger is an event that informs evidence collector 330 when to collect evidence associated with defects. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may set an incident. In response to receipt of incident triggers, evidence collector 330 gathers evidence regarding defects and/or incidents and provides the evidence to file system 340. The evidence gathered can be any form of unstructured data collected from various resources (e.g., switches, routers, load balancers, web servers, application servers, database servers, etc.) Evidence collector 330 places gathered evidence into persistent storage. For example, in one possible approach, the evidence is placed in an evidence file (for example, in HTML format) and stored at the file system 340. For example, when a number of "slow transaction" defects trigger the business impact threshold of an incident, an evidence collection trigger can be sent from event processor 320 to evidence collector 330. Evidence collector 330 can execute any executable program, including scripts, to collect any form of evidence, for example, a script (Unix shell, Python, Perl, etc.) to retrieve a web log from the server performing the slow transaction and execute a Simple Network Management Protocol (SNMP) GET command on a router. The script then appends the content of the web log and the results of the SNMP query into a single evidence file. In some cases, the script may also reformat the content of the evidence file in a format for providing a display in a web browser such as by inserting various HTML tags into the evidence file.

A persistent store such as database server 360 may store transaction data and other data, e.g., based on data received from processors 320 and 355, for access by an operator user through operator console 370 and admin console 380 of transaction server 164. Note that the admin console 380 and the operator console can optionally be provided in the same console. Operator console 370 may be used to access and perform operations on data at the database server 360. Admin console 380 may provide an interface through browser 382 to allow an operator to view reports, define transaction and defect definitions from received transaction signatures and perform other tasks. Defining a transaction definition and defect definition is discussed in more detail below.

Figure 4:
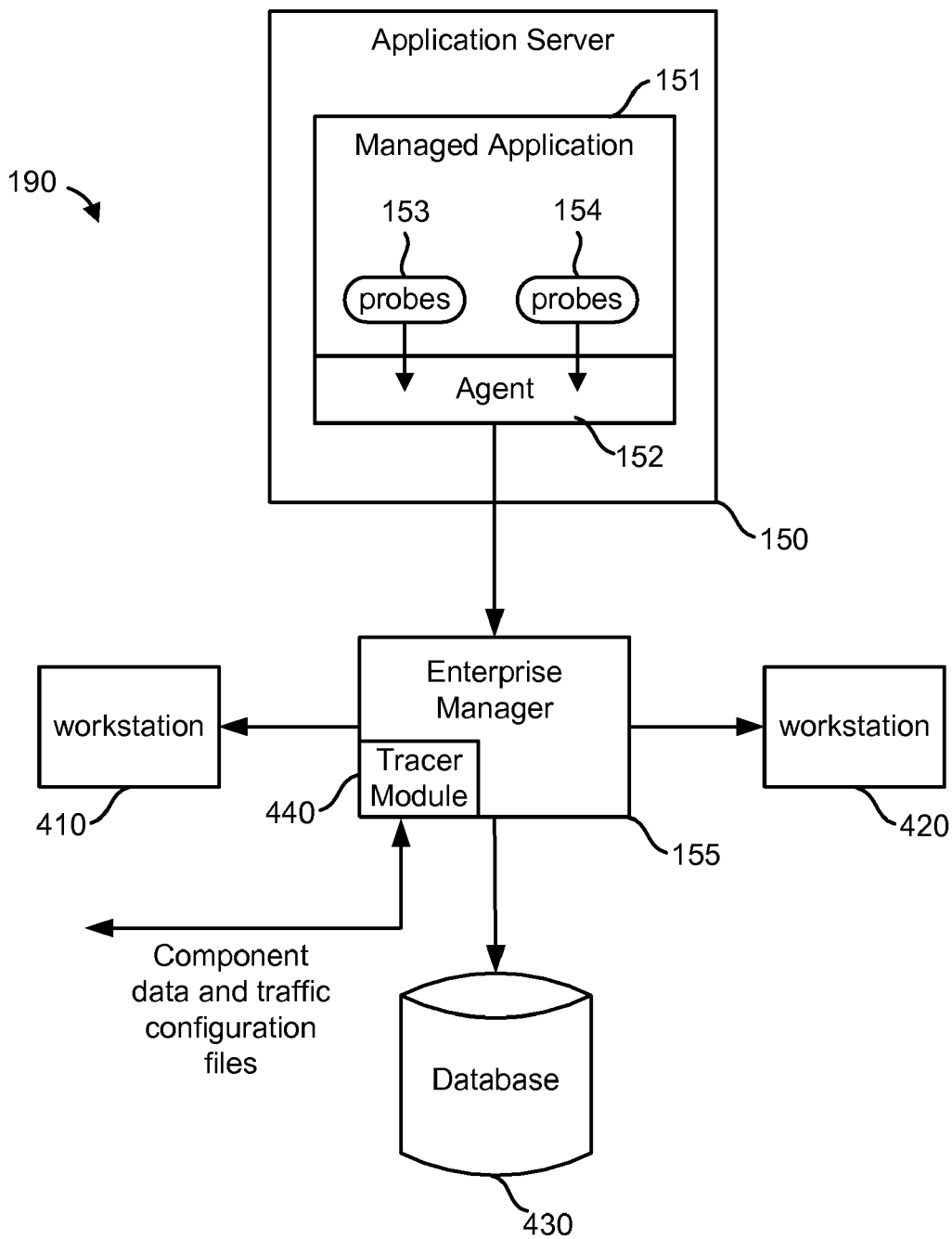
FIG. 4 is a block diagram of an embodiment of a system for monitoring an application.

FIG. 4 is a block diagram of an embodiment of a system for monitoring an application. As discussed above with respect to FIG. 1A, the application monitoring system 190 may be used to monitor an application and generate application runtime data. In one embodiment, FIG. 4 provides more detail for application server 150 and Enterprise Manager 155 of FIG. 1D. The system includes application server 150 which is in communication with Enterprise Manager 155 which, in turn, is in communication with example workstations 410 and 420 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g. modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety. See also FIG. 11.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 230 and 240 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 410 and 420 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections.

In one embodiment of the system of FIG. 4, one or more components are running on different computing devices. Alternatively, the components can run on the same computing device. A computing device on which each component may run is discussed in more detail below with respect to FIG. 5.

Enterprise manager 155 may also include tracer module 440 which may receive a hierarchy rules engine from transaction server 164 of FIG. 1D. In another approach, the tracer module 440 receives a configuration file which it parses to obtain the rules engine. In either case, the rules engine can be used to classify the application performance data according to different levels of the hierarchy. In one embodiment, the configuration file may include transaction server module identification, the date and time that the configuration file was created, application defect information, parameter defect lists and information regarding a domain, business processes associated with the domain, business transactions associated with the business processes, transactions associated with the business transactions and transaction components for each transaction. Further, for each of the business transactions, transactions and transaction components, defect definitions may be specified. Processing using a hierarchy is discussed in more detail below.

Figure 5:
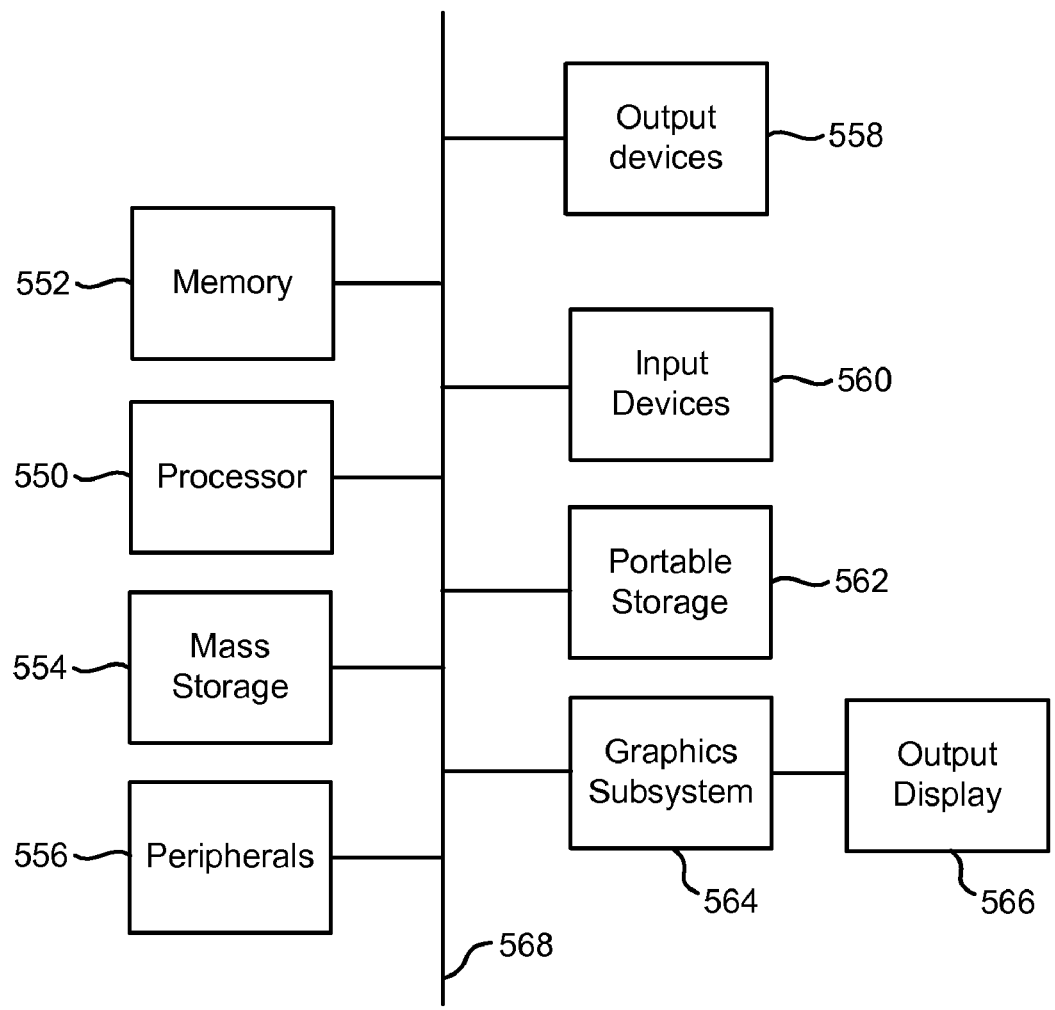
FIG. 5 is a block diagram of an embodiment of a computing system.

FIG. 5 is a block diagram of an embodiment of a computing system for use with the present technology. In one embodiment, the computing system may be used to implement client device 110, any of firewall 132, router 134 and switch 136 on one or more machines, network server 140, application server 150, database server 151, Enterprise Manager 150, workstations 410 and 420, database 430, traffic monitor 160, transaction server 164, synthetic transaction generator 172, script recorder 174 and synthetic transaction script module 170.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

Figure 6:
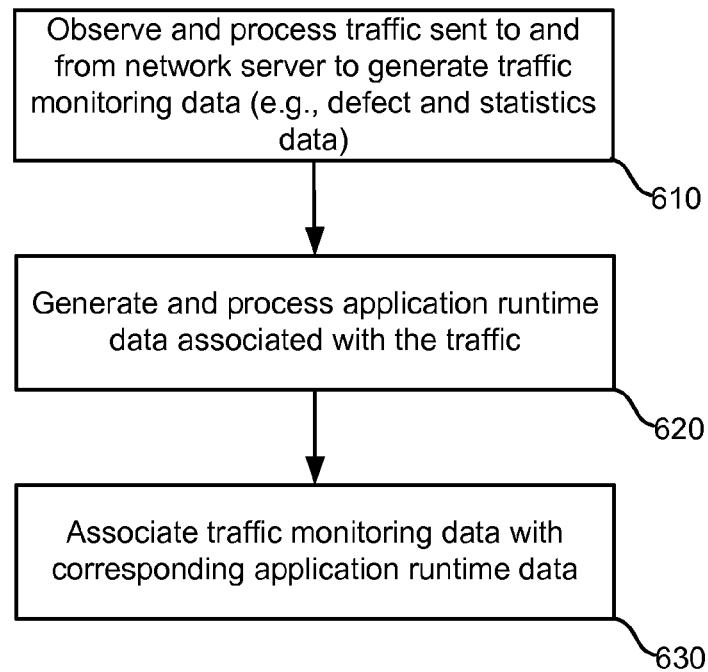
FIG. 6 is a flowchart of an embodiment of a process for monitoring a network service.

FIG. 6 is a flowchart of an embodiment of a process for monitoring a network service. The process can be performed by traffic monitoring system 180 and application monitoring system 190 of FIG. 1. The process begins with the traffic monitoring system observing and processing traffic sent to and from network server 140 to generate traffic monitoring data such as defects and statistics data, at step 610. In one embodiment, traffic may be received by a device in the line of communication between client 110 and network server 140. The device which receives the traffic sends a copy of the traffic to traffic monitoring system 180 while also forwarding the traffic to its intended destination. In particular, the traffic is received and processed by traffic monitor 160 and further processed by transaction server 164 of FIG. 1, e.g., to translate the traffic into transaction components, identify transactions from the transaction components, obtain statistics and defect data from the identified transactions, store transaction data and report information regarding the stored transaction data. Observing and processing traffic in step 610 is discussed in more detail below with respect to FIG. 7.

Application runtime data associated with the observed traffic is generated and processed by the application monitoring system at step 620. For example, the application may execute to handle a request from a network server to retrieve data from a database by sending a request to the database for the requested data, receiving the data in a response from the database, and sending the requested data to the network server in a response. For each of these actions performed by the application while processing the request, application runtime data can be generated, e.g., by the agent 152, and sent to Enterprise Manager 155 for processing. Step 620 is discussed in more detail below with respect to FIG. 11.

Traffic monitoring data can be associated with corresponding application runtime data at step 630. This can be achieved in different ways. For example, an identifier may be assigned by the application monitoring system to a request-response pair of a transaction component and provided to the traffic monitoring system in the response. Moreover, in some embodiments, the traffic monitoring system and the application monitoring system may use the same or similar classification rules for classifying transactions according to a hierarchy. In some embodiments, traffic monitoring data may be integrated with the application runtime data and viewed through an output device. Providing application runtime data associated with traffic monitoring data to an operator is discussed in more detail below, e.g., with respect to FIGS. 12A-13.

Figure 7:
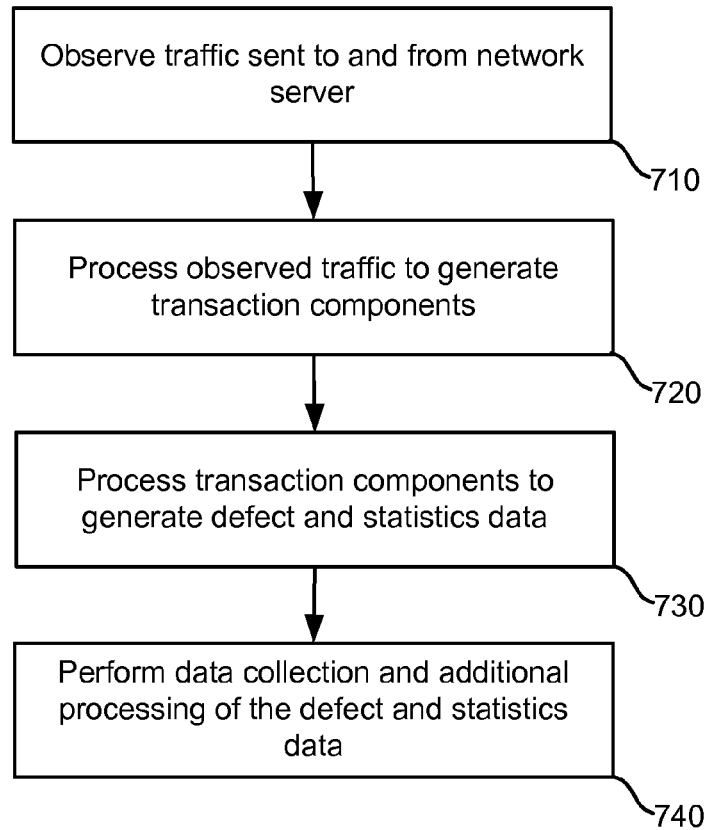
FIG. 7 is a flowchart of an embodiment of a process for observing and processing network server traffic.

FIG. 7 is a flowchart of an embodiment of a process for capturing and processing network service system traffic. In one embodiment, the flowchart provides more detail for step 610 of FIG. 6 performed by traffic monitoring system 180. First, traffic sent to and from network server 140 is observed at step 710, e.g., by receiving the traffic at router 134, switch 136 or some other point between firewall 132 and network server 140. The device which receives the traffic can provide a copy of the traffic to traffic monitoring system 180, enabling system 180 to observe the traffic. In another approach, observing the traffic can include intercepting the traffic and forwarding it to its intended destination.

The traffic monitor 160 processes the observed traffic to generate transaction components at step 720. Referring also to the discussion regarding FIG. 2, this processing may include constructing a data stream from data packets of the observed traffic, determining request-response pairs that form transaction components, and grouping the transaction components into classifications such as transactions, business transactions, business processes and a domain. This processing is discussed in more detail below with respect to FIG. 8.

Traffic monitor 160 processes the transaction components to generate defect and statistics data at step 730. In one embodiment, this involves processing transaction components to identify valid transactions using received transaction definitions, determining defect and statistics data from the valid transactions and defect definitions, and providing the defect and statistics data for further processing, storage and reporting. This processing is discussed in more detail below with respect to FIG. 9.

Transaction server 164 performs data collection and additional processing on the defects and statistics data at step 740. In one embodiment, data collection includes translating the defects and statistics data into a format which can be stored in a database, storing the data and reporting the data. The additional processing may include generating transaction and defect definitions from transaction signature data received from one or more recorders and providing the definitions to traffic monitor 160. Performing data collection and additional processing is discussed in more detail below with respect to FIG. 10A.

Figure 8:
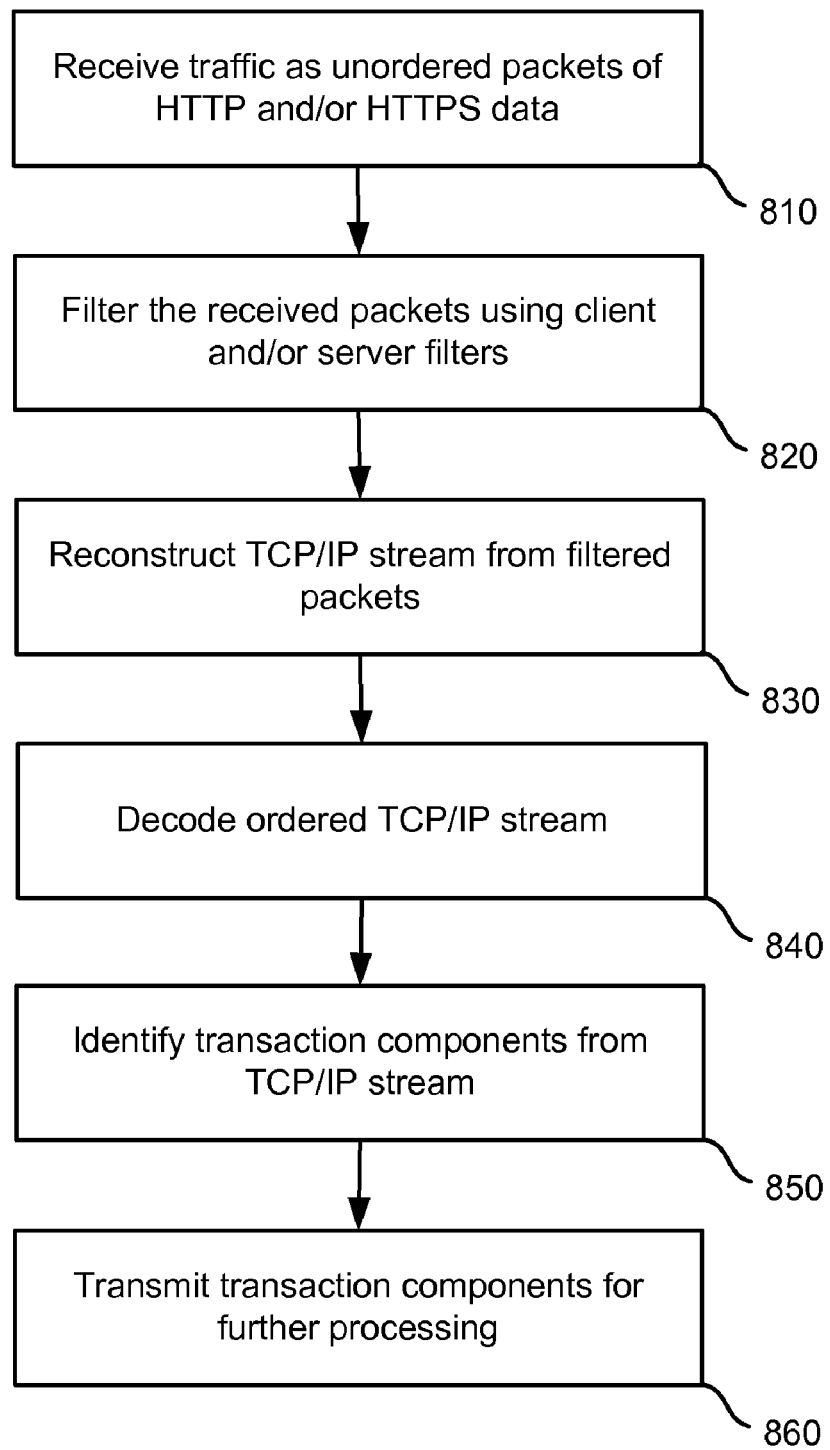
FIG. 8 is a flowchart of an embodiment of a process for obtaining transaction components from observed traffic.

FIG. 8 is a flowchart of an embodiment of a process for obtaining transaction components from observed traffic. In one embodiment, the process provides more detail for step 720 of the process of FIG. 7 and can be implemented by modules 210-250 of transaction server 160 of FIG. 2. At step 810, traffic is received, e.g., in the form of unordered packets of data provided in an HTTP and/or HTTPS format or some other network data transport format.

The unordered packets are filtered at step 820, e.g., via packet processing module 210 using filter data received from the transaction server 164. The filter data can apply to the client 110, network server 140 and/or application server 150. In one embodiment, the filtering achieves load-balancing of large packet streams across multiple traffic monitors. For example, if three traffic monitors process a large packet stream, each traffic monitor may be configured to process one third of the stream. The traffic monitors may be configured by a client or server filter file that instructs each monitor as to what range of traffic to process. The packet filtering can involve determining which traffic should be captured and processed and which packets should be discarded or ignored or otherwise processed differently.

Filtering may be performed based on client and/or server filters received by traffic monitor 160. The client and server filters may include one or more IP address ranges, for instance, which indicate which packets to process and/or which packets not to process for a particular traffic monitor. Thus, if an observed traffic packet has an IP address which is not within a corresponding IP address range of a corresponding filter, the traffic packet is not processed. The client filter file may enable filtering based on client IP address ranges. A server filter file may enable filtering on server IP address ranges. Filtering can also be based on IP-Address:TCP-Port combinations in addition to just IP-Address, or any other form of filtering. If no filter file is received and no client filters are specified for a traffic monitor module, the particular traffic monitor does not perform client filtering of incoming traffic packets. When one or more client filters are specified, any captured packet that does not match at least one of the client filters can be discarded. For example, a packet matches a filter if either its source or destination address is greater than or equal to the <FromIp> address of a client filter and less than or equal to the <ToIp> address of the same filter. In some embodiments, the packet source and/or destination address, client filter <FromIp> address and client filter <ToIp> address are 32-bit numbers.

After filtering the packets, a TCP/IP stream, for instance, is reconstructed from the filtered packets at step 830. The TCP/IP stream can be generated by analysis module 230 of traffic monitor 160 of FIG. 2 such as by generating requests and responses in a network protocol format (e.g., for HTTP format, the requests and responses have a header and data portion) from the received traffic packets. The generated TCP/IP stream is then decoded, if necessary, at step 840 by decoding module 240 of traffic monitor 160 (FIG. 2). In one embodiment, decoding module 240 decodes an encrypted ordered TCP/IP stream using a private key which is obtained from network server 140 or other source by traffic monitor 160 to provide a decoded TCP/IP stream to component ID module 250.

After decoding the stream, transaction components are identified from the TCP/IP stream at step 850 by component ID module 250. As discussed above, a transaction component can include a portion of a content page provided as a response to a request. In this case, component ID module 250 parses requests in the decoded TCP/IP stream to generate transaction components. For example, each request may be parsed to determine query, cookie, post, URL and session type name/value pairs. For example, a typical HTTP post request which can be parsed by traffic monitor 160 is shown below.

Request-line: POST /dir/file.html?query1=q1&query2=q2 HTTP/1.1\r\n
request-headers: Content-type: application/x-www-form-urlencoded\r\n
   Host: www.company.com\r\n
   Cookie: cookie1=c1; cookie2=c2\r\n
   Referer: https://www.company.com/dir/home.html?action=login\r\n
\r\n
request-body: post1=p1&post2=p2

An example of an HTTP parameter list derived from parsing the above request is shown below. Each parameter includes a type and name/value pair.

```
type="Query," name="query1", value="q1"
type="Query," name="query2", value="q2"
type="Cookie," name="cookie1", value="c1"
type="Cookie," name="cookie2", value="c2"
type="Post," name="post1", value="p1"
type="Post," name="post2", value="p2"
type="Url," name="Host", value="www.company.com"
type="Url," name="Path", value="/dir/file.html"
type="Url,"
name="Url",
value="www.company.com/dir/file.html?query1=q1&query2=q2"
type="Url," name="Referer",
value="www.company.com/dir/home.html?action=login"
```

The parameter list data is retrieved from the request listed above. In particular, the parameter list query data can be retrieved from the request-line of the request, the cookie data can be retrieved from the request headers, the post data can be retrieved from the request body, and the URL data can be retrieved from the request header and request line.

Identifying components at step 850 may include identifying primary and secondary components. As discussed above, a request can be processed to identify transaction components by comparing parameters in the request to parameters in a transaction definition. If the request includes a primary transaction component, the request can be categorized directly according to the transaction with which the primary transaction component is associated. A primary transaction component and associated secondary components can be identified by their use of the same session ID in one possible approach. In some embodiments, a primary component may be identified as the first component to have a particular session ID. In some embodiments, a primary component is a component having a "content type" value that starts with "text." If no primary transaction component is used, the request can be categorized according to a transaction definition which is met by a set of one or more transaction components of the request. Further, the request-response pair can be categorized according to the request, in one possible approach. The transaction components are transmitted by component ID module 250 to user ID module 260 and component processing module 270 of traffic monitor 160 for further processing at step 860.

Figure 9:
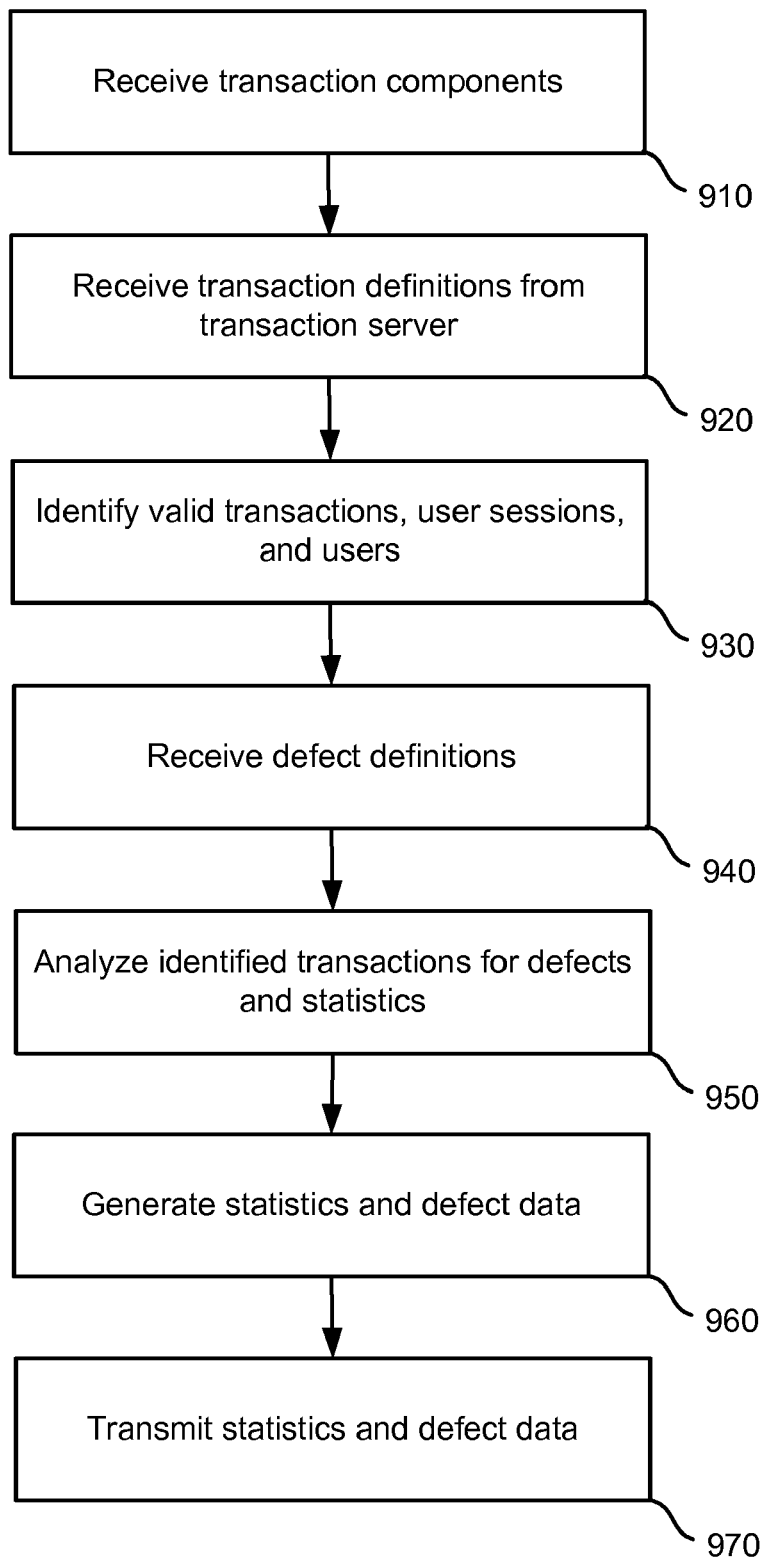
FIG. 9 is a flowchart of an embodiment of a process for processing transaction components from observed traffic.

FIG. 9 is a flowchart of an embodiment of a process for processing transaction components. In one embodiment, the flowchart of FIG. 9 provides more detail for step 730 of FIG. 7 and is implemented by modules 260-280 of traffic monitor 160 of FIG. 2. First, transaction components are received at step 910, e.g., including primary components and secondary components.

Transaction definitions are received by module 270 from transaction server 164 at step 920. The transaction definitions are generated by transaction server 164 from user input and/or transaction signatures received by transaction server 164 to describe templates that the traffic monitoring system should use in detecting patterns in the traffic. In one embodiment, recorders capture transaction data, generate transaction signatures from the transaction data and provide the signatures to transaction server 164. An operator may view the transaction signatures, modify them if desired, and select them to become transaction definitions. The transaction definitions may include HTTP parameter definitions, for instance, such as type, name and specification parameters. The type contained in the HTTP parameter definitions may include a query, cookie post, URL or session manager type. An HTTP parameter definition of a transaction name may be "user login" or any other name provided by an operator. The specification parameters may indicate a URL associated with the transaction, user identification, client machine identification, server machine identification, and other parameters associated with the particular transaction. Generation of transaction definitions from transaction signatures is discussed in more detail below with respect to steps 1050-1060 of FIG. 10B.

After receiving transaction definitions, traffic monitor 160 identifies valid transactions, user sessions and users at step 930. In one embodiment, a user name associated with a user session is detected by user ID module 260. The user name may include a login name for a user and can be included in the first request-response pair associated with a session. Once the login name or user name is identified, the login name and corresponding session ID (included in every request and response pair) is forwarded as login data to transaction server 164. User ID module 260 then forwards the session identification data to statistics and defects monitor 280.

Component processing module 270 identifies valid transactions by comparing the transaction definitions to the transaction components. In some embodiments, component processing module 270 may compare a URL of a transaction component with the transaction definitions. In some embodiments, component processing module 270 may also compare user identification, client machine identification, and other information of the transaction components to the transaction definitions. If the data contained in the transactions components does not match any transaction definition, the transaction component can be discarded, ignored, identified as "unclassified" or otherwise processed.

Defect definitions are received from transaction server 164 by traffic monitor 160 at step 940. At step 950, identified transactions are monitored for defects and statistics. Step 950 may be performed by statistics and defects monitor 280 of the system of FIG. 2. For example, valid transactions can be compared to the defect definitions to determine if any of the transactions are defective. Defect definitions may specify what comprises a defect and/or an acceptable transaction. In any case, transactions identified as defective are identified at step 950. For example, the defect definitions may specify that a transaction having a particular URL should not have a response time over a particular response time threshold. Thus, for all transactions having the particular URL and having a response time over the response time threshold, the transaction is identified as defective. A defective transaction is a transaction with one or more defects.

Statistics and defect data are then generated from the identified transactions at step 960 by statistics and defects monitor 280. Statistics may include, e.g., response time, count of completed transactions, count of uncompleted transactions, and other statistics for one or more transactions. Defect data may include defect and incident information, count information such as the number of times a particular defect has occurred and other data associated with transactions identified as being defective. The statistics and defect data is transmitted to transaction server 164 at step 970. In some embodiments, the defect data may be in XML format and the statistics data may be in binary format.

Figure 10A:
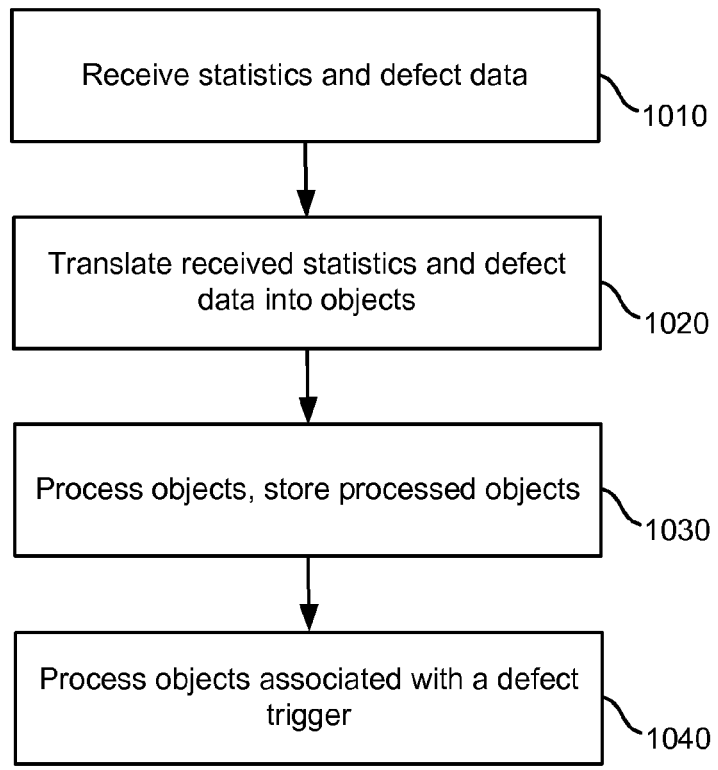
FIG. 10A is a flowchart of an embodiment of a process for performing data collection.

FIG. 10A illustrates a flowchart of an embodiment of a process for performing data collection. In one embodiment, the flowchart provides more detail for step 740 of the flowchart of FIG. 7 and is performed by transaction server 164. At step 1010, statistics and defect data are received by transaction server 164 from traffic monitor 160. In one embodiment, the statistics data is provided for one or more transactions based on the transaction URL. In some embodiments, the defects and statistics may be received by event collector 130 and statistics collector 350, respectively (FIG. 3).

The statistics and defect data are translated into a persistent storage state and stored, e.g., in an SQL database. In this embodiment, the statistics and defect data are first translated into objects such as Java objects at step 1020. The translation may be performed by collectors 310 and 350, as illustrated in FIG. 3. Statistics collector 350 receives statistics data, e.g., in a binary format, from traffic monitor 160, translates the received data into objects and provides the objects to statistics processor 355.

The objects are processed and stored at step 1030 by event processor 320. In one embodiment, storing the objects includes retrieving login data from the objects and storing the login data as a session ID and user name pair.

Next, the objects associated with a defect trigger are processed at step 1040. In some embodiments, the objects are processed to determine whether a defect is new or matches pre-existing defect criteria. In this embodiment, if a defect does not match pre-existing defect criteria, a new defect is created. Handling of triggers and the corresponding gathering of evidence is discussed in more detail above.

Figure 10B:
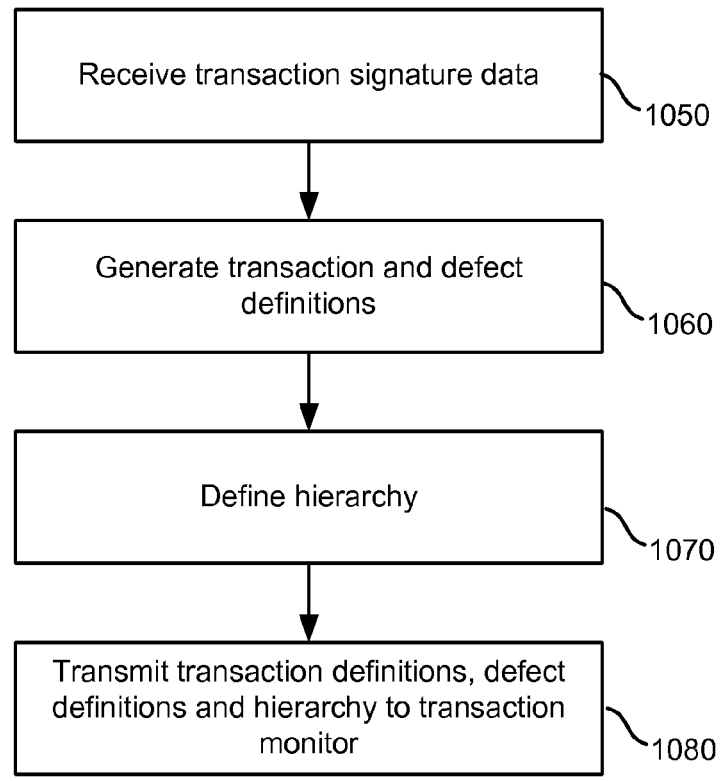
FIG. 10B illustrates a flowchart of an embodiment of a process for generating and transmitting transaction and defect definitions.

FIG. 10B illustrates a flowchart of an embodiment of a process for generating and transmitting transaction and defect definitions. In one embodiment, the flowchart provides more detail for step 740 of the flowchart of FIG. 7. As discussed above, a transaction signature describes an individual transaction that is captured by a recorder. A received transaction signature may later be manipulated into a transaction definition through transaction server 164 and used by traffic monitor 160 to identify valid transactions. Transaction signature data may be received by event collector 310 from one or more recorders, such as recorders 114, 162 and 174 of FIG. 1D and translated into objects before being stored in database server 360 (FIG. 3).

After receiving the transaction signature data, transaction definitions and defect definitions can be generated at step 1060. In one embodiment, admin console 380 provides an interface through browser 382 (FIG. 3) for this purpose. In particular, the operator may manipulate the transaction signature data and enter other commands through the interface to generate the transaction and defect definitions. This provides a convenient method for generating transaction definitions without having to generate them from scratch, although it is also possible for the operator to provide one or more transaction definitions from scratch. Rather, transactions can be recorded from actual client-application interactions, data for the transactions can be provided to an operator as a transaction signature for a particular transaction, and the operator may modify, e.g., edit, the signature through the interface.

For example, admin console 380 may present transaction signature data for a login transaction signature which includes parameters indicating that a login transaction request was received from a particular client machine A by a particular front-end web server B, that the request from client machine A included a specific user name parameter and password parameter, and that the request took twenty milliseconds to complete. An operator may manipulate the transaction signature into a transaction definition by changing the parameters, e.g., to identify a transaction from any client machine (rather than only client machine A). This can be done by deleting an identifier in the transaction signature associated with client machine A, for instance. A wildcard character can also be used to specify, e.g., a subset of a group of machines which are to be included in a transaction definition. The transaction signature can similarly be modified to omit a reference to any specific user name and password parameters and to specify a response time no greater than fifty milliseconds, for instance, (rather than exactly twenty milliseconds). In this case, the transaction definition is made more general and inclusive than the original transaction signature. A balance should be struck in modifying transaction definitions to avoid over- or under-inclusiveness. The operator can thus modify a transaction signature and select or "promote" the transaction signature to a transaction definition for transactions of interest.

For example, assume the operator is interested in monitoring a login process which involves one or more web pages which allow a user to login to a web site. The trained operator can recognize such web pages by their URLs. Requests with URLs for those web pages may therefore be generalized and promoted to transaction definitions. Moreover, a request with a URL for a login web page will typically include an identifier of the particular user in a query field of the URL, e.g., after the "?" in the URL. This user-specific information would result in an unnecessarily narrow transaction definition because only login requests from that specific user would match. Accordingly, the URL can be edited to delete the user-specific information, thereby generalizing the transaction definition so that login requests from all users will match the transaction definition.

In some embodiments, a signature parameter of a response time threshold may be used to identify defective transactions. For example, a transaction signature may be modified and saved as a defect definition so that transaction signatures which match the defect definition indicate a defective transaction. In another approach, a transaction signature may be modified and saved to define a non-defective transaction so that transaction signatures which match the non-defect definition indicated a non-defective transaction. In any case, the modified transaction signature may then be saved as a transaction definition. Additionally, generating a transaction or defect definition may include defining a business transaction, a domain, an application and user identifiers, business processes associated with an application, and other information. An application may be an attribute of a business process and include a session ID, user ID and other information.

Thus, admin console 380 may access the stored transaction signature data, provide it through an interface to be edited by an operator, and store the resulting transaction and/or defect definitions at database server 360. In other embodiments, an operator may manually generate transaction and defect definitions and store them in database server 360.

At step 1070, the operator can define a hierarchy. For example, a domain level can be defined at the top of the hierarchy followed by one or more business processes and business transactions associated with the business processes, where the detected transactions in the traffic can be associated with the business transactions. See also the discussions associated with step 102 of FIG. 1B and the component processing module 270 of FIG. 2. A hierarchy rules engine can be generated based on the transaction and hierarchy definitions for use in classifying interactions with an application.

After generating transaction definitions, defect definitions and a hierarchy, they are transmitted to traffic monitor 160 at step 1080 for use in monitoring incoming traffic, identifying transactions to process and classifying the transactions according to the hierarchy.

Figure 11:
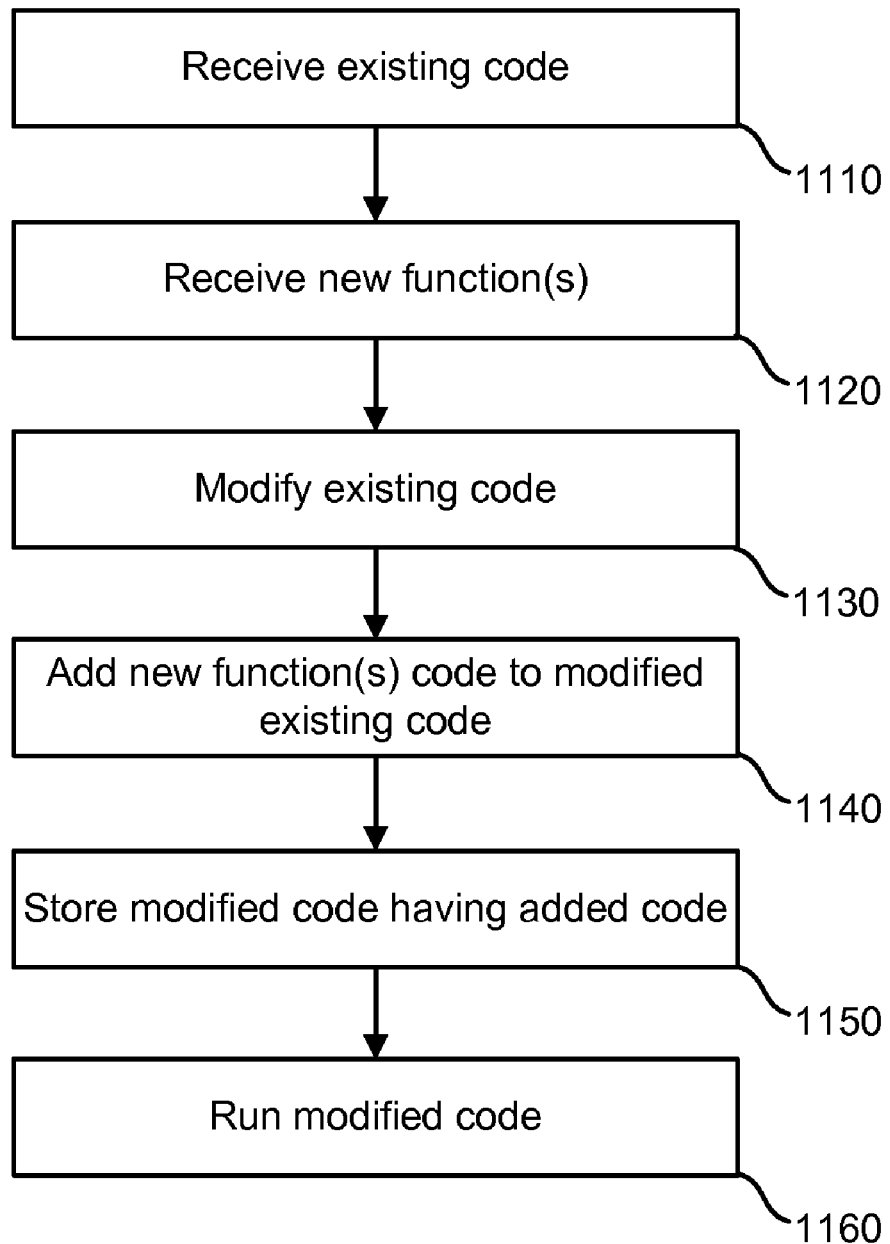
FIG. 11 is a flowchart of an embodiment of a process for modifying application code to generate application runtime data.

FIG. 11 is a flowchart of an embodiment of a process for modifying application code to generate application runtime data. As discussed in connection with FIG. 4, application monitoring system 190 monitors one or more applications, such as application 151 of application server 150, and generates application runtime data from the monitored applications. To achieve this, application code is configured to generate and provide application runtime data which is associated with processing of requests. Put another way, the flowchart of FIG. 11 is one embodiment of a process of modifying the existing object code of an application in order to monitor the application. In step 1110, a probe builder or other module receives the existing object code. In step 1120, the probe builder receives the new functionality, which can be new classes and processes that allow for monitoring of the application. In some embodiments, the new classes and processes can be provided by one or more libraries.

The existing code is modified to prepare for additional code at step 1130. In some embodiments, the existing code is modified to account for the size of the additional code, e.g., by adjusting indices for the existing code. Instructions of the existing code which follow an insertion point of the additional code are moved to make room for instructions of the additional code. For example, if the new code consumes eight bytes, then the indices for the existing code are adjusted to reflect a displacement of eight bytes. Additionally, all references to bytecode within an instruction, e.g., a pointer reference for a jump or branch instruction, may be adjusted.

All or part of the new functionality (e.g., the new classes/methods) is added to, combined with, or otherwise associated with the existing modified code at step 1140. Note that instrumenting bytecode of an application is only one example of a technique for monitoring an application. Various other techniques can be used, such as plugging into an exit built into the application or network server. In one embodiment, step 1140 may include adding a function which writes application data, such as a request-response pair identifier, an application server IP address and other information, to a response header generated by application code, as discussed in more detail below with respect to step 1220 of the flowchart of FIG. 12A. The application data may be observed and processed as network server traffic by traffic monitor 160 as the response travels from application server 150 to network server 140 and to client device 110. The modified code which includes the added code is stored at step 1150. In step 1160, the modified code is run, thereby generating application runtime data.

Figure 12A:
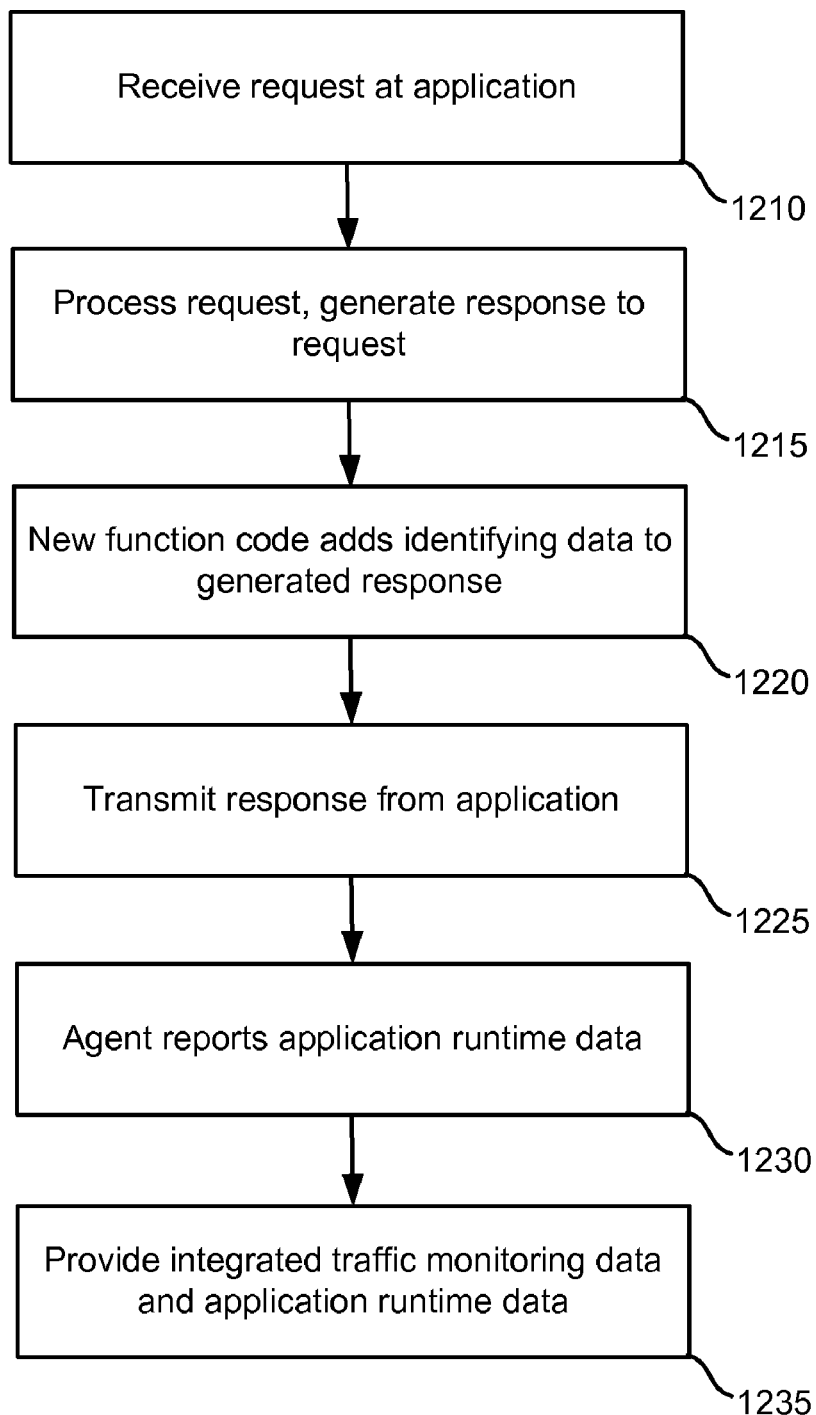
FIG. 12A is a flowchart of an embodiment of a process for processing an application request to associate traffic monitoring data with corresponding application runtime data.

FIG. 12A is a flowchart of an embodiment of a process for processing an application request to associate traffic monitoring data with corresponding application runtime data. One feature of the present technology involves integrating traffic monitoring data and application runtime data. In some embodiments, the integrated traffic monitoring data and application runtime data may be accessed through traffic monitoring system 180. In this approach, identifying data can be communicated to traffic monitoring system 180 from application monitoring system 190 or from another location to enable traffic monitoring system 180 to access application runtime data corresponding to traffic monitoring data for a particular request-response pair. For example, the identifying data may include index data, a request-response pair identifier and/or other information regarding the application runtime data. The identifying data may be communicated to system 180 by inserting the data into a response generated by an application, in one possible approach. In one embodiment, application monitoring system 190 may insert the identifying data into the response. The response and the identifying data may then be observed and processed by traffic monitoring system 180.

In one embodiment, FIG. 12A provides more detail of step 630 of FIG. 6. A request is received at an application at step 1210. The application processes the request and generates a response at step 1215 thereby forming a request-response pair. Processing the request may include performing actions by application code within application server 150 as well as accessing database server 151 or some other back-end server, e.g., by calling a servlet or EJB of the application.

Identifying data for the request-response pair is inserted into the generated response by new function code at step 1220. In some embodiments, the identifying data may be inserted into the response sometime before the response has been completely generated rather than after the response is completed. Other application-related information can also be provided in the response, including an application server ID, such as an IP address of the machine that the agent is running on, a virtual machine ID, which is a name associated with agent 152, a request handler ID, which is an entry point and/or a servlet name (servlet class name) which is involved in generating the response, and a servlet response time.

At step 1225, after adding the identifying data and other application-related information to the response, the response is transmitted from the application to network server 140, which may or may not perform additional processing of the response. After any further processing is performed, the response is sent by network server 140 to client 110. Traffic monitoring system 180 may observe and process the response such as by determining transaction components associated with the response, determining if the response is part of a defective transaction, and incorporating the response into defect and transaction statistics as discussed above with reference to FIG. 7. Moreover, the identifying data may be retrieved from the response and used to retrieve application runtime data associated with the response. The application-related information can also be retrieved. For example, if it is determined that the response is part of a defective transaction, corresponding application runtime data may be identified from the identifying data. This is discussed in more detail below with respect to FIG. 12B.

Application runtime data is reported by agent 152 of application server 150 to Enterprise Manager 155 at step 1230. The application runtime data may be indexed to the identifying data added to the response as well as other application data regarding processing of a request by application 151. Integrated traffic monitoring data and corresponding application runtime data can be provided to the operator via an interface, for instance, at step 1235 as discussed in more detail below with respect to FIG. 12B. Essentially, the traffic monitoring data and application performance data can be cross-referenced to one another to allow the operator to easily access both types of data to provide an enhanced understanding of network and application activity.

Figure 12B:
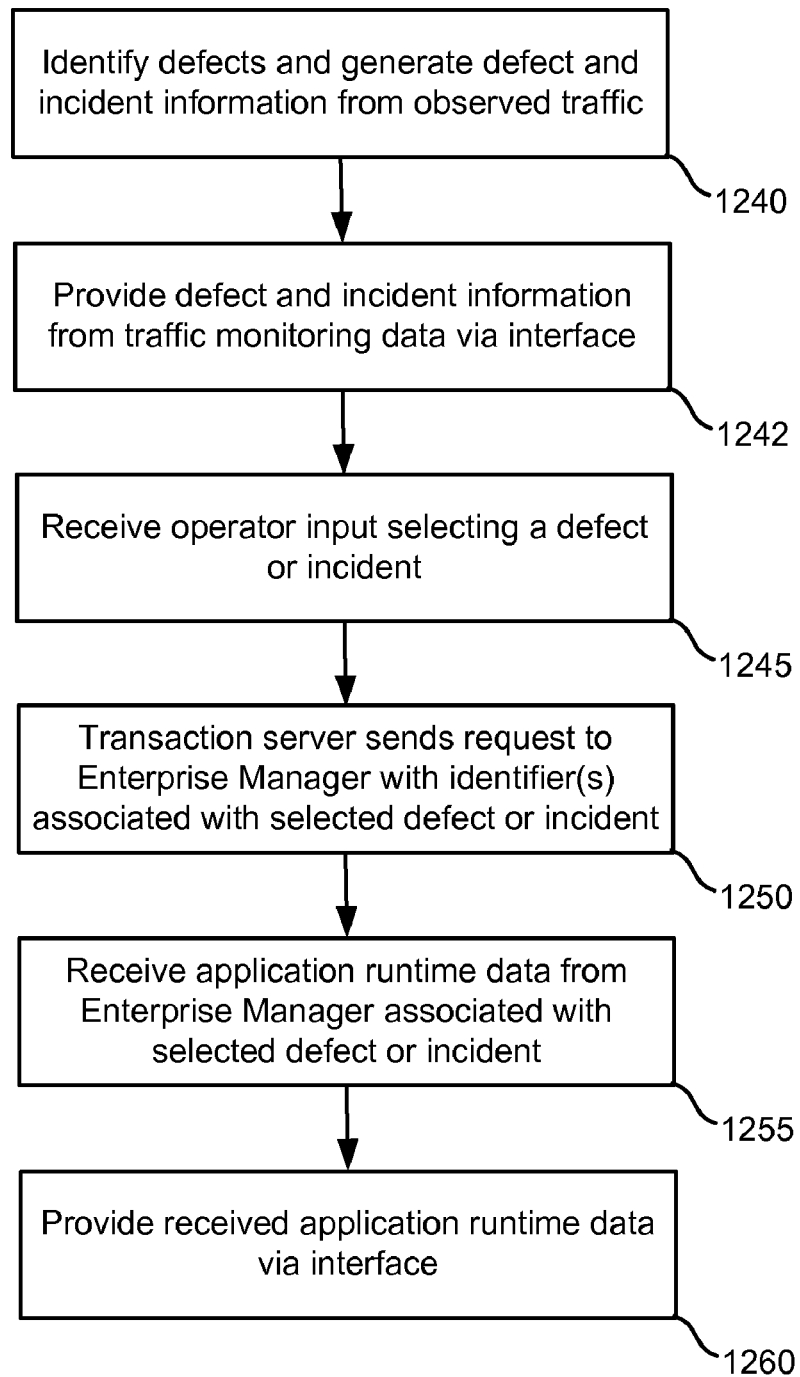
FIG. 12B is a flowchart of an embodiment of a process for associating application runtime data with corresponding traffic monitoring data.
Figure 12C:
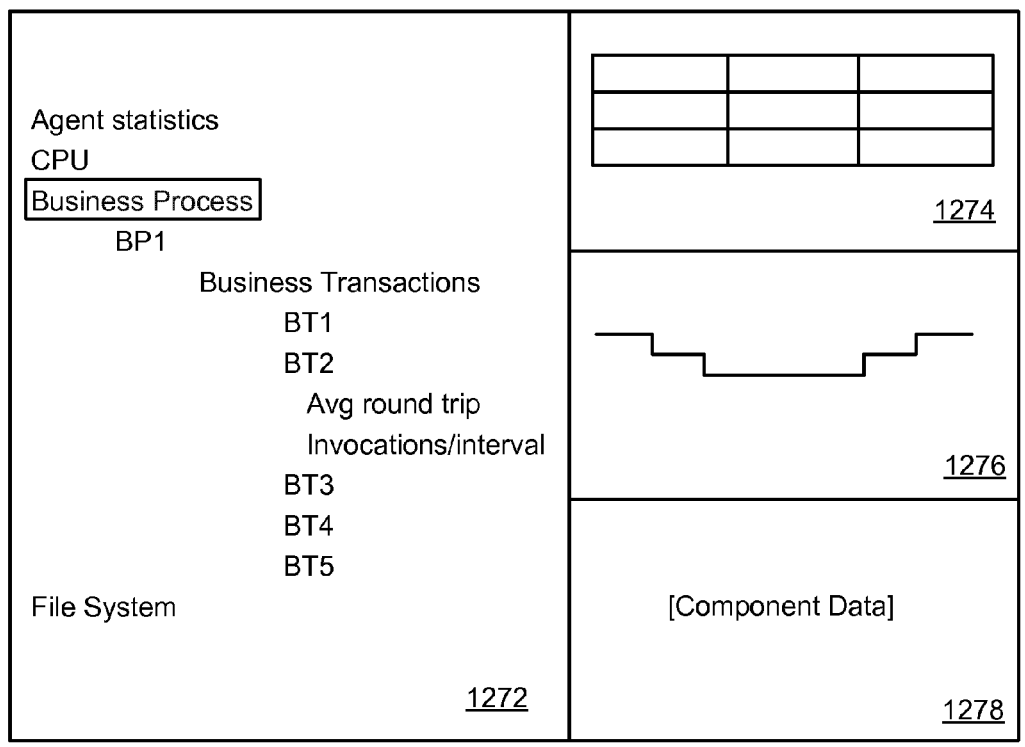
FIG. 12C is an example interface for displaying traffic monitoring data and application runtime data.

FIG. 12B is a flowchart depicting an embodiment of a process for associating application runtime data with corresponding traffic monitoring data. In one embodiment, the flowchart of FIG. 12B provides more detail for step 1235 of the process at FIG. 12A. Defects and incidents are identified and associated information is generated from the traffic monitoring data at step 1240. In one embodiment, this step is performed by traffic monitor 160 and transaction server 164. Step 1240 may include performing steps 710-730 of the process of FIG. 7 as discussed above. Identification of defects is discussed above with respect to step 950 of the flowchart at FIG. 9.

Next, data associated with the generated defects or incidents may be provided to an operator at step 1242, e.g., through an interface provided within browser 382 (FIG. 3). The interface content is provided to browser 382 by admin console 380. The operator can provide an input through the interface selecting a particular defect or incident for which application runtime data is desired, at step 1245. In response, transaction server 164 sends a request to Enterprise Manager 155 with identifying data associated with the selected defect or incident at step 1250. As mentioned, such identifying data may have been previously retrieved by traffic monitoring system 180 from a response provided to client 110, in one approach. For example, the identifying data may be associated with a request-response pair associated with a defect or one or more request-response pairs associated with one or more defects which triggered an incident. In another embodiment, transaction server 164 may send business transaction or transaction ID information to Enterprise Manager 155. In this case, Enterprise Manager 155 may have a mapping of business transaction or transaction ID to application runtime data. Enterprise Manager may then use the mapping to identify application runtime data associated with the selected defect or incident. In any case, when a request for application runtime data is received by Enterprise Manager 155 from transaction server 164, Enterprise Manager 155 gathers the requested data and sends it to transaction server 164.

Transaction server 164 receives the requested application runtime data associated with the selected defect or incident at step 1255. In one embodiment, the application runtime data is provided in an interface based on a hierarchy represented by a tree having a number of nodes. A portion of the application runtime data which is associated with a selected level of the hierarchy can be displayed based on a selected node. In some embodiments, the application runtime data may be received in some other format. Once the requested application runtime data is received, it is provided to the operator through the interface or some other means at step 1260.

In some embodiments, traffic monitoring data, such as statistics, defect and incident data derived from observed traffic, along with application runtime data, may be accessed through application monitoring system 190. In some embodiments, the application runtime data and/or corresponding traffic monitoring data can be displayed based on a hierarchy represented by a tree. A representative example of an interface for providing such a display, illustrated in FIG. 12C, includes display regions 1272, 1274, 1276 and 1278. Display region 1272 represents the hierarchy as a tree with selectable nodes. "RT" denotes response time. The tree has the following form, in one possible approach:

```
Domain
    Business Processes
        Business_Process1
            Business Transactions
                Business_Transaction1
                    Average Response time (ms)
                    Errors Per Interval
                    Invocations Per Interval
                Business_Transaction2
                    Average Response time (ms)
                    Errors Per Interval
                    Invocations Per Interval
        Business_Process2
```

Thus, the tree can organize the presentation of application runtime data and/or traffic monitoring data based on a hierarchy which includes a domain, business processes, business transactions and other nodes. Display region 1274 illustrates a representative table without data. The table in an actual interface may have information regarding defects of an incident which has been classified to the selected level of the hierarchy, for instance. An operator can select any of the rows of the table to have the corresponding trace displayed in the display region 1276, which includes a simplified representation of trace. Display region 1278 may provide other details regarding the invoked application components, such as an identifier of the request-response pair associated with the selected trace and other component data.

Figure 13:
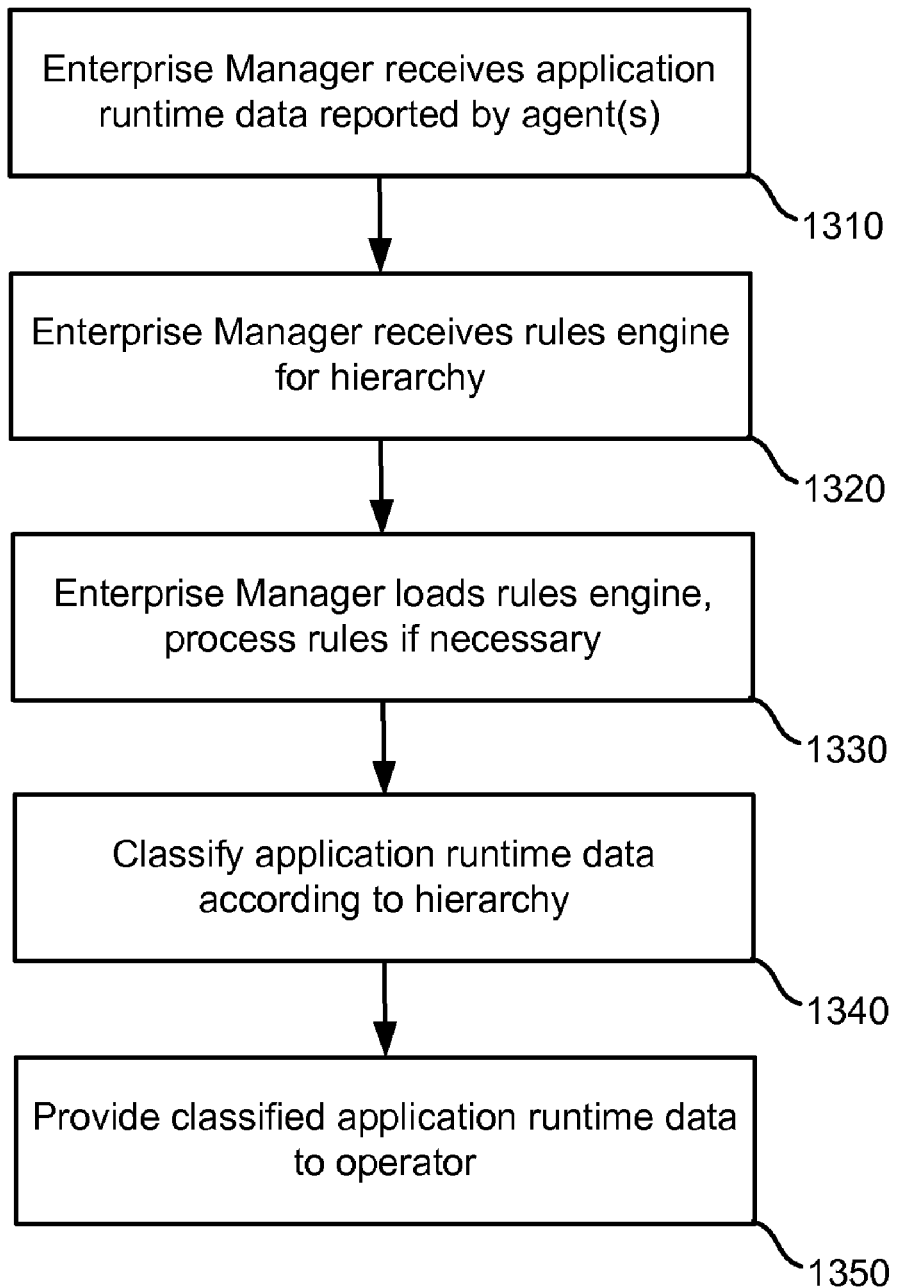
FIG. 13 is a flowchart of an embodiment of a process for providing traffic monitoring data and corresponding application runtime data to an operator via an interface.

FIG. 13 is a flowchart of an embodiment of a process for providing integrated traffic monitoring data and corresponding application runtime data to an operator through application monitoring system 190. In some embodiments, the process of FIG. 13 provides more detail for step 630 of the process of FIG. 6. Application runtime data reported by agent 152 is received by Enterprise Manager 155 at step 1310. The application runtime data can be associated with request-response pairs and can be reported as discussed above with respect to step 1230 of FIG. 12A.

Next, a rules engine for a hierarchy is received by Enterprise Manager 155, e.g., from transaction server 164, at step 1320. The set of rules can be generated by traffic monitoring system 180 in response to observed traffic and operator inputs. In some embodiments, the rules engine can be shared with the application monitoring system once, periodically, or at some other rate with respect to integration of data between traffic monitoring system 180 and application monitoring system 190.

In one embodiment, the rules engine may be generated from an XML file and can provide information for associating transactions with one or more levels of a hierarchy. In particular, the rules engine may provide classification rules and/or descriptions for identifying a domain, business processes within the domain, business transactions within the business processes, transactions within the business transactions and transaction components within the transactions. For example, the rules engine may describe HTTP request characteristics associated with a particular transaction, such as a URL host name, URL parameters, HTTP post parameters, cookie parameters and session manager parameters for each transaction.

The rules engine is loaded by Enterprise Manager 155 at step 1330. The rules can be modified, if necessary, to generate a modified rules engine which is tailored to the needs of the application monitoring system. For example, Enterprise Manager 155 may generate a modified set of rules to identify transaction components, e.g., by parsing the set of rules of the received rules engine. To this end, a configuration file which is used to generate the rules engine may include header information identifying each transaction component definition and body information containing the details of the transaction component definitions, such as name/value pairs that are associated with a transaction component. When the header information is detected during parsing, the information in the body is read and stored. A rule is then derived from the transaction component definition body portion.

Modified rules for identifying a transaction, business transaction, business process, domain and optionally other information can similarly be generated to provide the modified rules engine. The rules to identify the different levels of the hierarchy are derived from the portions of the rules engine which describe the corresponding elements. In one embodiment, the hierarchy can be represented by a tree having nodes which define the different levels of the hierarchy. In some embodiments, the rules engine used by the application monitoring system can be shared with traffic monitoring system 180.

Application runtime data may be classified according to the hierarchy at step 1340. For example, a transaction component may be associated with a request received and processed by application server 150. See the discussion above regarding step 102 (FIG. 1B) regarding binding of transaction components to the hierarchy. Step 102 can be applied equally by the traffic monitoring system using its rules engine or by the application monitoring system using its rules engine. Or, the traffic monitoring system and the application monitoring system can use the same rules engine.

In particular, application runtime data generated for each request received and processed by an application may be associated with a transaction component. The request received by the application includes parameter data associated with a transaction component. The parameter data may include, e.g., URL host name, URL parameters, HTTP post parameters, cookie and/or session manager parameters for each transaction. The agent, for instance, can compare the parameter data against the set of rules identifying a transaction component. If the parameter data matches a transaction component rule, the request is associated with the particular component. Optionally, the comparison can be made by the Enterprise Manager 155 or other entity.

For example, consider a business process for purchasing a book through a web site. This business process may include business transactions of performing a login, shopping to select a book, adding a selected book to a cart, and proceeding to checkout where payment information is entered. The business transaction of proceeding to checkout may include a request for a checkout content page and a response which provides the checkout page; the request for the checkout page may be processed by a checkout servlet within the monitored application. The rules engine received at step 1320 can identify the "checkout" transaction by URL host name (web server name), URL parameters (the URL itself), HTTP post parameters (parameters passed in the request), cookie parameters (cookies maintained, created or deleted as a result of the request) and/or session manager parameters (name/value pairs obtained from a session manager). Application runtime data reported at step 1310, which indicates the checkout servlet has processed a request, may include servlet identification information as well as URL host name, URL parameters, HTTP post parameters, cookie parameters and/or session manager parameters associated with the request processed by the servlet. These parameters will match the parameters for the checkout transaction, and the servlet will be associated with the transaction component at step 1340.

Moreover, because the transaction component is part of a transaction, a transaction is part of a business transaction, a business transaction is part of a business process and a business process is part of a domain, in the example hierarchy, the servlet can be associated with those additional levels of the hierarchy as well at step 1340.

A received request can be marked or otherwise associated with a transaction and business transaction. The reported application runtime data classified according to the hierarchy is then provided to an operator by Enterprise Manager 155 at step 1350. In one embodiment, the application runtime data may include average response time, errors per interval, method invocations per interval and other information for a transaction. This information can be provided along with the hierarchy information corresponding to the transaction and may be reported to an operator, e.g., through an interface provided by workstations 410 or 420 or other machines (not pictured).

Synthetic Transaction Generation

In some embodiments, the present technology generates synthetic transactions for a network service. The synthetic transactions may be generated based on traffic monitoring data and application runtime data. The traffic monitoring data may be based on traffic received and transmitted by a front end server of a web service or network system, as well as traffic which is transmitted internally between servers, machines and other devices of a web service system. Moreover, the application runtime data may be associated with the traffic monitoring data using identifying information such as a GUID as discussed. In some embodiments, both the traffic monitoring data and application runtime data are processed to determine the scope and frequency of synthetic transactions to transmit to the web service.

Figure 14:
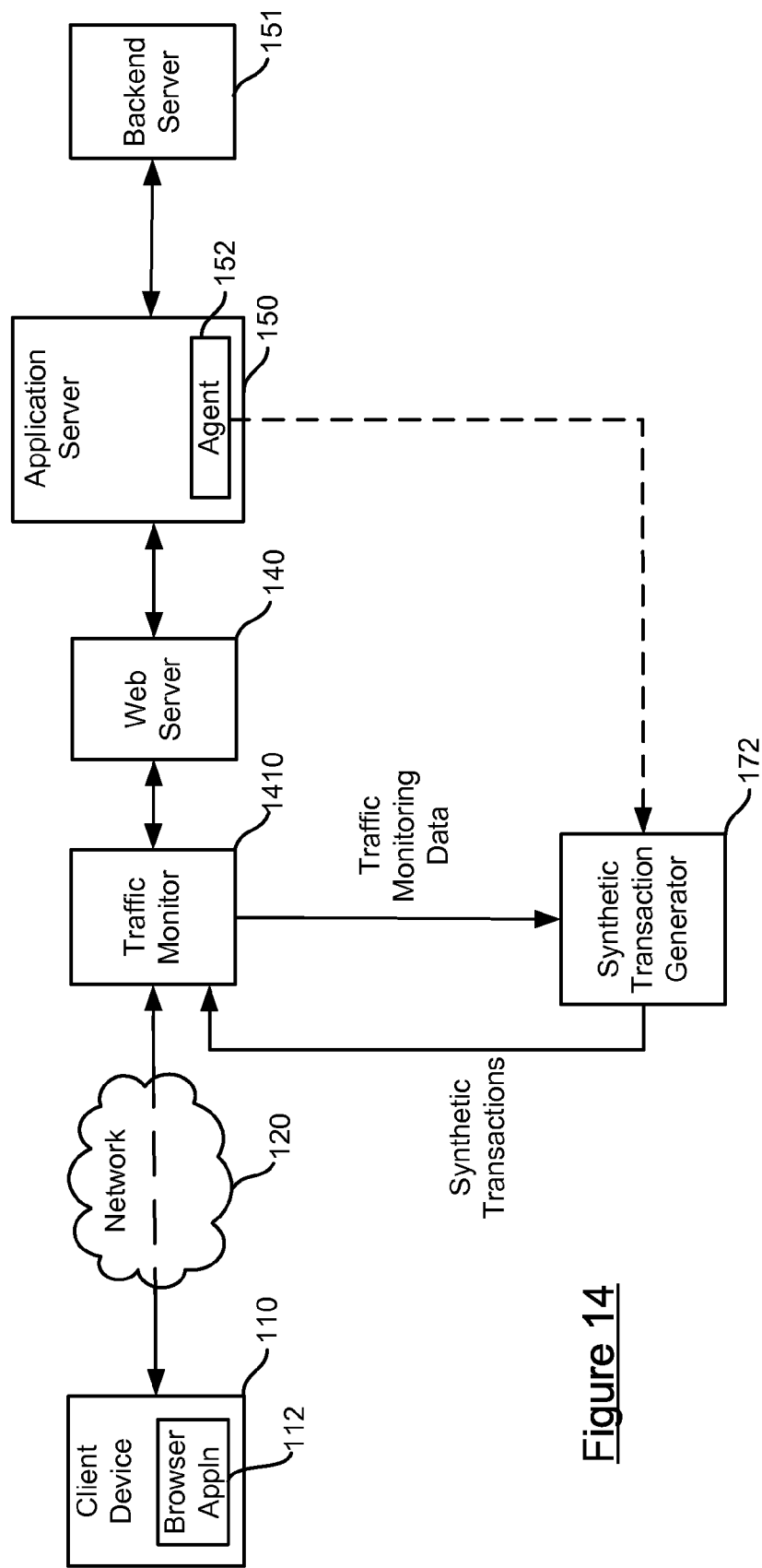
FIG. 14 is a block diagram of an embodiment of a system for generating synthetic transactions from traffic monitoring data.

FIG. 14 is a block diagram of an embodiment of a system for generating synthetic transactions from traffic monitoring data. In one embodiment, synthetic transactions are generated based only on application runtime data. FIG. 14 includes several elements of the system of FIG. 1D, including client device 110, network 120, web server 140, application server 150, database server 160, and synthetic transaction generator 172. The system of FIG. 14 also includes traffic monitor 1410, which may be any device able to observe traffic traveling between client 110 and web server 140. For example, traffic monitor 1410 may be implemented by firewall 132, router 134, or switch 136 of FIG. 1D, or as any network tap or mirrored port hardware, software or combination thereof. In one embodiment, traffic monitor 1410 may be implemented using hardware from the Cisco MDS 9000 Family of Multi-layer Directors and Fabric Switch, by Cisco Systems, Inc., of San Jose, Calif. In operation, traffic monitor 1410 observes traffic sent to and from web server 140 from client device 110, and provides corresponding traffic monitoring data to synthetic transaction generator 172. In one embodiment, traffic monitor 1410 observes TCP/IP traffic, for instance, at the protocol level and forwards it to synthetic transaction generator 172 while also sending the traffic to its intended destination. In some embodiments, the synthetic transactions may be sent to web server 140 and traffic monitor 1410 over network 120.

In some embodiments, in addition to receiving actual traffic between web server 140 and client device 110 (and other requesting devices not pictured), traffic monitor 1410 may also observe synthetic transactions from synthetic transaction generator 172. By observing synthetic transactions, traffic monitor may confirm that a transaction was sent to web server 140. This may help in determining whether web server 140 is operating correctly, and is able to receive requests, as discussed in more detail below.

In one embodiment, synthetic transaction generator 172 of FIG. 14 may be implemented by synthetic transaction generator 172, Enterprise Manager 155, or transaction server 164 of FIG. 1D. After receiving the traffic monitoring data, synthetic transaction generator 172 processes it, generates synthetic transactions and may send the generated transactions to web server 140 through traffic monitor 1410. Before sending the synthetic transactions to web server 140, synthetic transaction generator 172 may determine an acceptable level of traffic load, e.g., based on the traffic experienced by server 140 and observed by monitor 1410. Additionally, the functionality of the generated transactions may be derived from the scope of the functionality of the observed traffic. In some embodiments, synthetic transaction generator 172 may include all or some of the logic of synthetic transaction generator 172 of FIG. 15.

Figure 15:
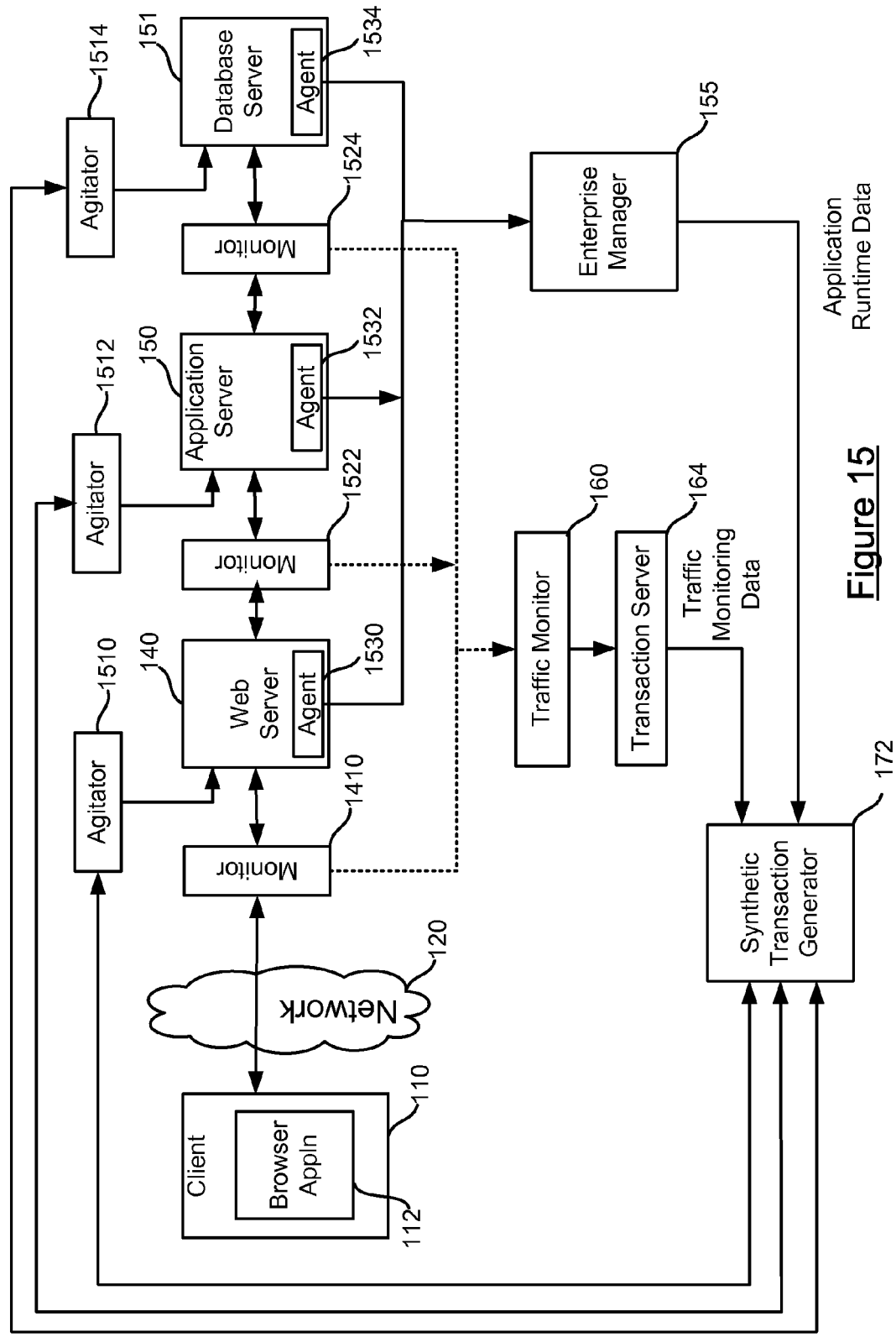
FIG. 15 is a block diagram of an embodiment of a system for generating synthetic transactions based on traffic monitoring data and application runtime data.

FIG. 15 is a block diagram of an embodiment of a system for generating synthetic transactions based on traffic monitoring data and application runtime data. Thus, unlike the system of FIG. 14, the system of FIG. 15 may generate synthetic transactions derived at least in part from application monitoring data. FIG. 15 includes several elements of the system of FIG. 1D, including client 110, network 120, web server 140, application server 150 and database server 151. The system also includes monitors 1520, 1522 and 1524, agitators 1510, 1512 and 1514, agents 1530, 1532 and 1534, and synthetic transaction generator 172.

Monitors 1520, 1522 and 1524 observe traffic sent to and from web server 140, application server 150 and backend server 151, respectively. The observed traffic is then sent by each monitor to traffic monitor 160. This is indicated by the dotted lines in FIG. 15 in order to make the communication between the monitors 1520, 1522 and 1524 and traffic monitor 160 distinguishable from the communication between agents 1530, 1532 and 1534 and enterprise manager 155. Monitors 1520, 1522 and 1524 may each be implemented as an instance of traffic monitor 1410 discussed above with respect to FIG. 14. Observation of traffic by a monitor is discussed in more detail below.

Agitators 1510, 1512 and 1514 may generate synthetic instructions for the one or more servers to which they are each connected. Additional agitators may be included in the system of FIG. 15, for example, near client 110 and sending data over network 120 to web server 140. In some embodiments, each agitator may receive instructions to generate synthetic transactions from synthetic transaction generator 172. In this case, synthetic transaction generator 172 receives traffic monitoring data and application runtime data from transaction server 164 and enterprise manager 155, respectively. Synthetic transaction generator 172 then arbitrates the received data to determine the scope and frequency of synthetic transactions that should be generated. Arbitration of the received data is discussed in more detail below with respect to the process of FIG. 18. In some embodiments, rather than receiving instructions from synthetic transaction generator 172, each agitator receives traffic monitoring data and application runtime data from transaction server 164 and Enterprise Manager 155, respectively. In this case, each agitator includes the logic discussed with respect to FIG. 18 which arbitrates the data received from transaction server 164 and Enterprise Manager 155. Including the agitator logic in each agitator may prevent a need for synthetic transaction generator 172. However, agitators of this embodiment would require processing power to arbitrate the received traffic and application runtime data. After arbitrating the received data, each agitator determines whether to generate and transmit synthetic transactions to a server it is connected to. In some cases, one agitator may provide synthetic transactions to more than one server.

Servers 140, 150 and 151 include agents 1530, 1532 and 1534. Similar to agent 1532 of FIG. 14, Agents 1530, 1532 and 1534 generate application runtime data from servers 140, 150 and 151, respectively, and report the application runtime data to Enterprise Manager 155.

As discussed above with respect to FIGS. 2, 8 and 9, traffic monitor 160 receives observed traffic from one or more monitors, generates transaction components (request-response pairs) from the received traffic, generates statistics and defects data from the components and sends the statistics and defects data to transaction server 164. As discussed above with respect to FIGS. 3 and 10, transaction server 164 receives the statistics and defects data from traffic monitor 160 and sends the data to synthetic transaction generator 172 as traffic monitoring data. Enterprise Manager 155 receives application runtime data from agents 1530, 1532 and 1534, processes and aggregates the data and forwards the aggregated data to synthetic transaction generator 172.

Synthetic transaction generator 172 arbitrates the application runtime data and traffic monitoring data to generate synthetic transactions. Upon receiving the application runtime data and traffic monitoring data, synthetic transaction generator 172 arbitrates the received data to determine whether any synthetic transactions should be sent to any of servers 140, 150 or 151. Arbitration of the received data is discussed in more detail below. If synthetic transactions should be provided, synthetic transaction generator 172 generates the transactions and sends transaction instructions to agitators 1510, 1512 or 1514. Synthetic transaction instructions may be sent collectively to each agitator or to one or more agitators. The agitators then execute the received instructions to generate and send synthetic transactions to one or more servers. Synthetic transaction generator 172 is discussed in more detail below with respect to FIG. 16.

Figure 16:
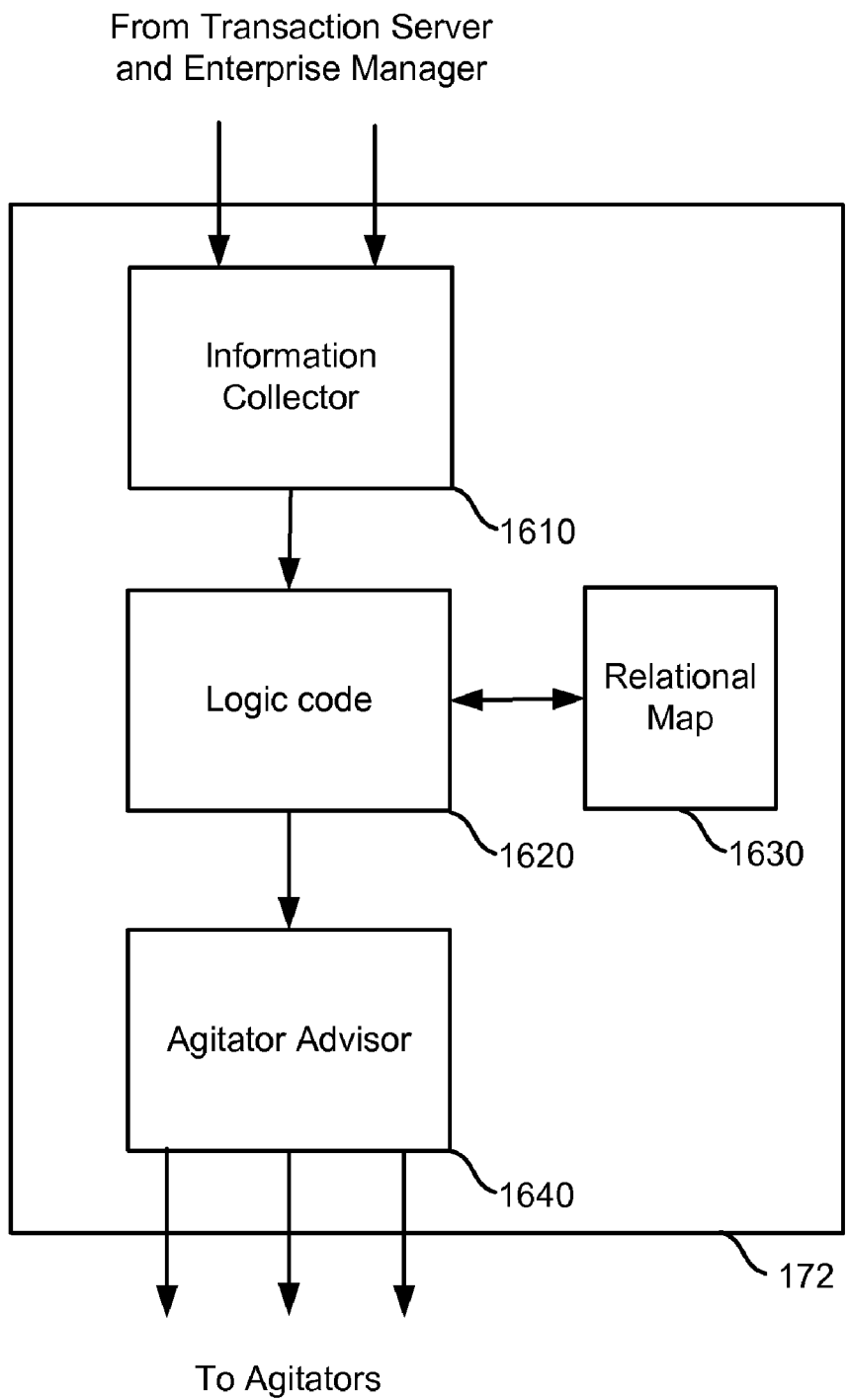
FIG. 16 is a block diagram of an embodiment of synthetic transaction generator logic.

FIG. 16 is a block diagram of an embodiment of synthetic transaction generator 172 which includes information collector 1610, logic code 1620, relational map 1630 and agitator advisor 1640. Information collector 1610 receives traffic monitoring data from transaction server 164 and aggregated application runtime data from Enterprise Manager 155. The traffic monitoring data may include statistics data which identifies the types of transactions (as well as business transactions) identified in the monitored network system traffic, how often a type of transaction is received, and other data. The transaction types may be identified by a URL, URL parameters, and other data. The traffic monitoring data may also include defect data which may identify transactions identified to be defective by the transaction URL and URL parameters as well. The application runtime data may identify applications that have been used to process application server requests, application components (such as specific EJBs and servlets within an application) used to process application server requests, how many times and/or how often each application and application component is used, the performance of each application component (for example, the response time associated with an application component), and other data. In some embodiments, information collector 1610 may store the received data upon receiving it. Upon receiving data, information collector 1610 forwards the received data to logic code 1620.

Logic code 1620 compares data received from information collector 1610 to target data and performing logic based on the results of the comparison. The received data may include traffic monitoring data and application runtime data. Comparing the data may include comparing the scope and frequency of the received data and the target data. The logic may result in generating instructions for generating synthetic transactions based on the results of the comparison. Synthetic transactions instructions are provided to agitator advisor 1640, discussed further below.

The scope of received data may indicate the scope of traffic received by a network system as well as the scope of the application and application components used to process the received traffic. The scope of the received traffic may be determined as a list of all the requests received by the network system, such as a list of requested URLs. Data regarding the received requests may be received by synthetic transaction generator 172 from transaction server 160. The scope of the applications and application components, such as a servlet or an EJB, is indicated within the application runtime data reported by agent 152 to Enterprise Manager 155. In some embodiments, when an application component is invoked, the path of the component (which includes the application component and the application that contains it) is reported by agent 152 as part of its application runtime data. The application runtime data which includes the application and the application component may be received by synthetic transaction generator 172 from Enterprise Manager 155 (or, in some case, directly from agent 152).

The frequency with which the data is received may indicate the number of times the request was received of the application component that was invoked over a period of time. For example, the frequency of a login transaction may be one hundred occurrences per hour. The frequency of a transaction component may be five invocations every fifteen seconds.

Target data indicates the goal or expected level of traffic monitoring data and corresponding transactions performed to process the traffic. The traffic monitoring data and application runtime data may be integrated as needed as discussed above with respect to step 630 of the process of FIG. 6. In one embodiment, logic code 1620 may retrieve the target data from relational map 1630. For example, target data for a login transaction may be eighty requests per hour. Thus, if a login request was received one hundred times in an hour, the target would be met. Target data for a particular transaction component may be ten invocations every fifteen seconds. If the actual invocation frequency for the transaction component was five invocations every fifteen seconds, the target would not be met and synthetic transaction instructions may be generated accordingly.

After comparing the data, logic code 1620 may then perform logic based on the comparison between the actual data and target data. Performing logic may include determining whether synthetic transactions should be generated, determining the load level of synthetic transactions to place on a network system, and sending synthetic transaction instructions to agitator adviser 1640. Operation of logic 1620 is discussed in more detail below with respect to step 1750 of FIG. 17.

Agitator adviser 1640 receives instructions to generate synthetic transactions from logic code 1620. For example, the instructions may specify a synthetic transaction URL to send the request to, the URL parameters if any to include in the transaction, the server or agitator to send the transaction, the number of times to send the synthetic transaction, and optionally other information. An example of a pseudo synthetic transaction instruction is below: send instruction to URL [login transaction] with parameter [username, password] to server[front-end web server] every 10 seconds for two minutes.

Adviser 1640 receives the instructions, generates instructions for one or more of agitators 1510, 1512 and 1514 based on the instructions received from logic code 1620 and sends the generated instructions to the agitators. The instructions may be similar to the pseudo instruction shown above. In some embodiments, agitator adviser 1640 may advise different agitators differently. For example, adviser 1640 may send instructions to agitator 1510 in communication with front-end web server 140, but not to agitators associated with back-end database 151 or application server 150.

In one embodiment, one or more of agitators 1510, 1512 and 1514 may include logic code to determine when to send synthetic transactions to the corresponding one or more servers connected to the agitator. In this case, each of the agitators may include information collector modules, logic code, access to a relational map, and optionally an adviser module.

Figure 17:
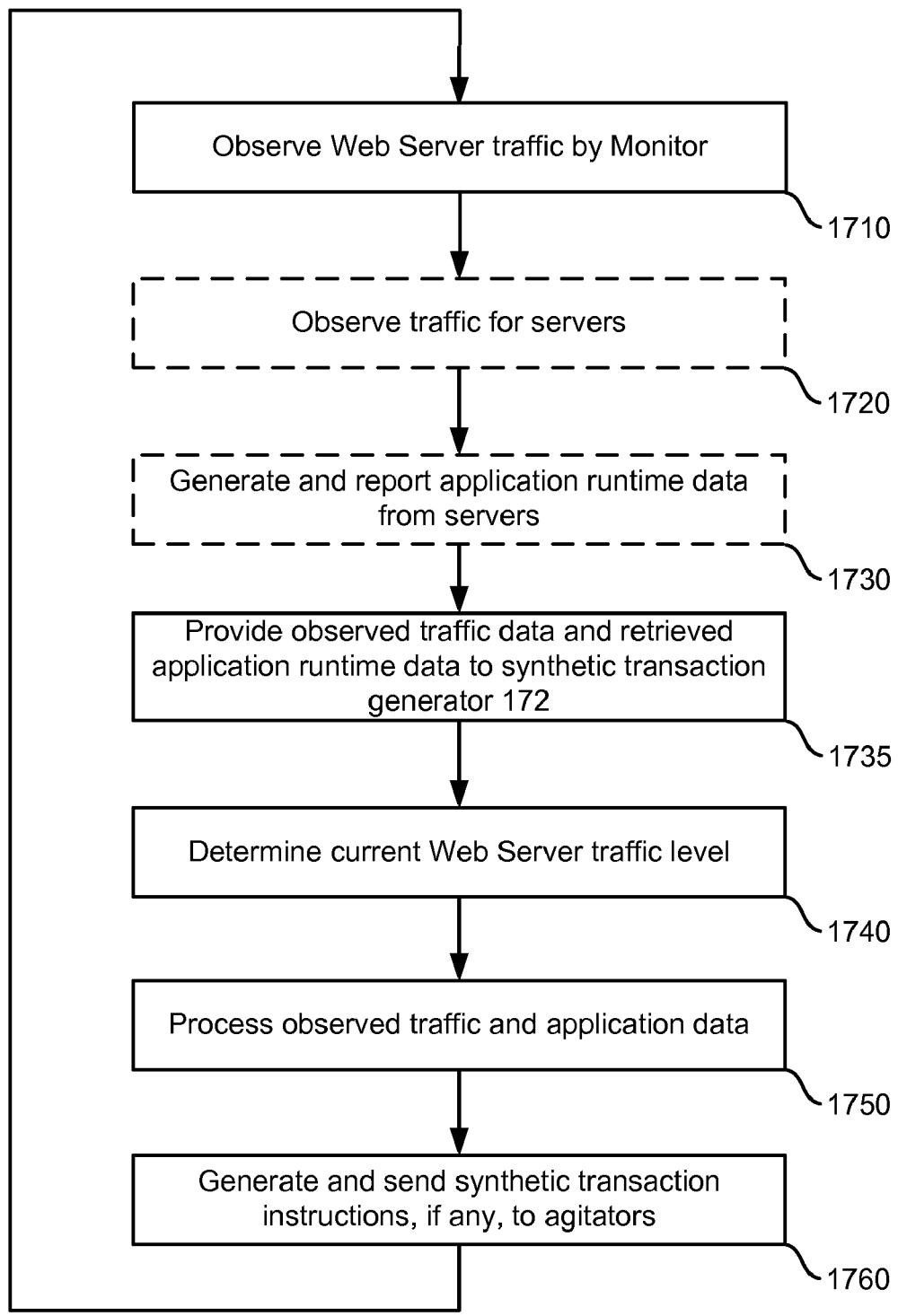
FIG. 17 is a flowchart of an embodiment of a process for generating and sending synthetic transactions.

FIG. 17 is a flowchart of an embodiment of a process for generating and sending synthetic transactions and is discussed with respect to the system of FIG. 15. However, steps 1710 and 1740, 1750 and 1760 of the process of FIG. 17, which relate to monitoring and processing traffic to generate synthetic transactions, may apply as well to the system of FIG. 14. This limited application of the process is due to the system of FIG. 14 not being able to generate and process application runtime data or traffic between internal servers of the network system.

First, network system traffic is observed at step 1710. In one embodiment, traffic traveling between client 110 and server 140 over network 120 is observed by monitor 1410. Monitor 1410 forwards the observed traffic to traffic monitor 160 as well as to the traffic's intended destination.

Other traffic between internal servers of the system of FIG. 15 may be observed at step 1720. Step 1720 is optional as indicated by the dashed line comprising step 1720. The additional traffic may be observed between web server 140 and application server 150 by monitor 1522 and between application server 150 and database server 151 by monitor 1524. Each of monitors 1522 and 1524 forward the observed traffic to traffic monitor 160 as well as to the traffic's intended destination.

Application runtime data is generated and captured from monitored servers at step 1730. In one embodiment, the generated application runtime data is received from agent 152 within application server 150. Application runtime data may also be received from other servers. For example, application runtime data may be received from agent 1530 of web server 140 and agent 1534 of database server 151. Step 1730 is optional as indicated by the dashed line comprising step 1730 in the flowchart of FIG. 17.

Observed traffic and retrieved application runtime data are provided to synthetic transaction generator 172 at step 1735. Traffic monitor 160 receives the observed traffic from one or more of monitors 1410, 1522 and 1524 and may process the observed traffic (as discussed above with respect to the process of FIGS. 8 and 9) and to provide traffic monitoring data, including, e.g., statistics and defect data, to transaction server 164. Transaction server 164 may then provide the traffic monitoring data to synthetic transaction generator 172. In the system of FIG. 14, the traffic monitoring data is provided directly to synthetic transaction generator 172. The retrieved application runtime data is provided to Enterprise Manager 155 by one or more of agents 1530, 1532 and 1534. Enterprise Manager 155 aggregates the retrieved application runtime data and provides the aggregated data to synthetic transaction generator 172, as discussed above with respect to FIGS. 1A-13.

Steps 1740-1760 of the process of FIG. 17 are performed by synthetic transaction generator 172. After receiving the traffic monitoring data or application runtime data, the current level of web server traffic is determined from the received data at step 1740. In one embodiment, the level of web server traffic is determined from the traffic observed between client 110 and web server 140. This traffic is observed at step 1710 as discussed above. The load may be expressed as requests per minute or per hour, EJBs called per hour, or some other metric.

After determining the current traffic level, the traffic monitoring data and application runtime data are processed at step 1750. The traffic monitoring data and application runtime data may be processed in several ways. In one embodiment, the traffic monitoring data and application runtime data may be compared to target levels of traffic monitoring data and application runtime data for particular functions of the web service. Comparing the received data to target levels can help identify potential problems in the web service as well as provide guidance in providing appropriate levels of synthetic traffic to the web service, as discussed in more detail below with respect to FIG. 18. In some embodiments, the traffic monitoring data and application runtime data may be processed to generate synthetic transactions based on traffic load, as discussed in more detail below with respect to FIG. 23. Exemplary logic statements for processing traffic monitoring data and application runtime data are discussed in more detail below with respect to FIG. 21.

After processing the traffic monitoring data and application runtime data, synthetic transaction instructions are sent to agitators 1510, 1512 and 1514 at step 1760. The synthetic transactions instructions indicate what synthetic transactions the receiving agitator should generate and send to the one or more servers to which it is connected. The instructions sent to the agitators may be the same or different for each agitator depending on which server the agitator is in communication with. For example, if only a read data function of backend server 1534 is to be tested, instructions may be sent to agitator 1514. The instructions may direct the agitator to generate one or more synthetic transactions to test a read data function of backend server 151.

In some embodiments, steps 1740-1760 can be performed by one or more of agitators 1510-1514. In this case, rather than processing received data and sending instructions to an agitator by synthetic transaction generator 172, each agitator receives traffic monitoring data and application runtime data. Each agitator then processes the received data to determine whether or not to send out synthetic transactions to the one or more servers connected to the agitator.

Figure 18:
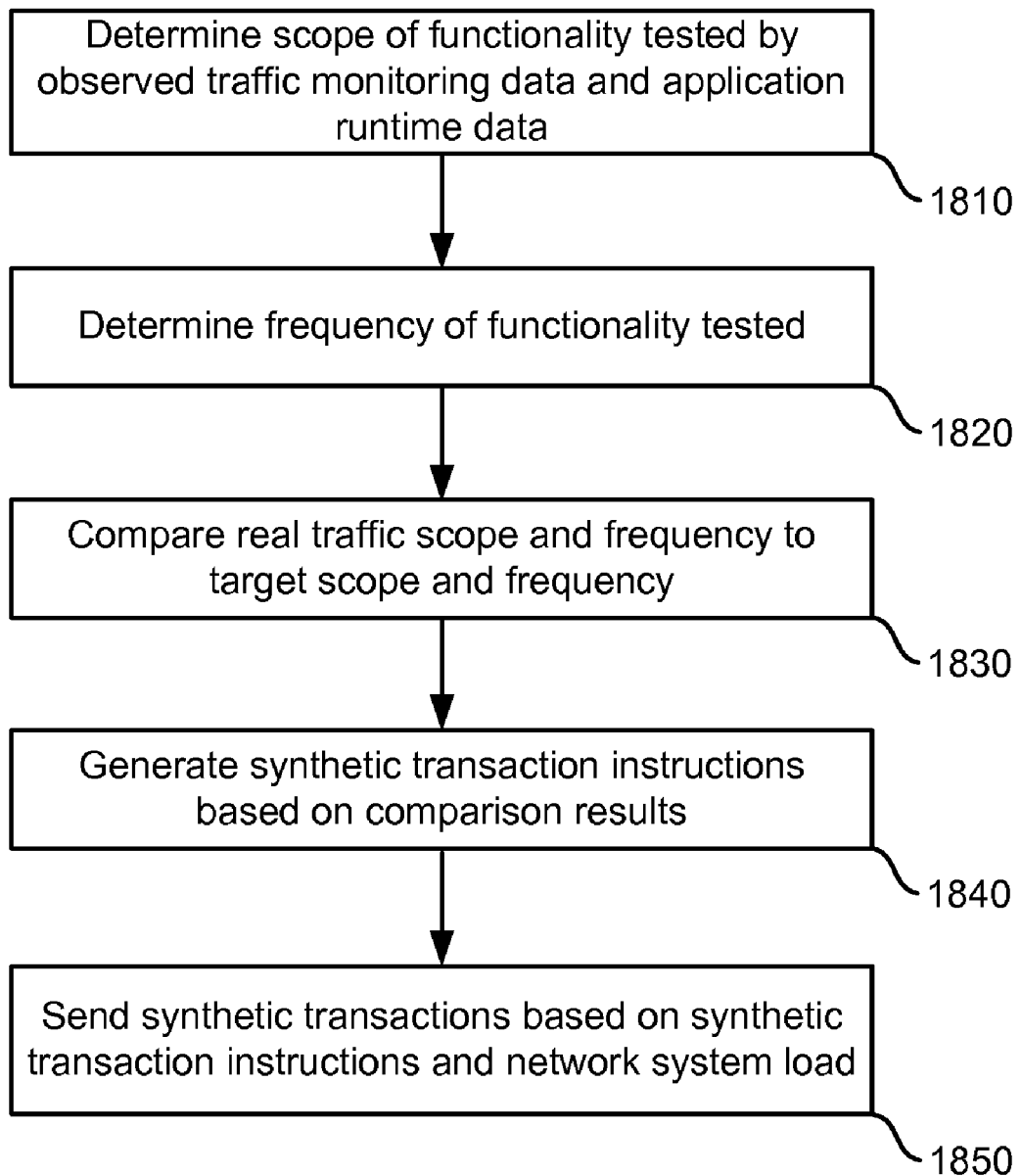
FIG. 18 is a flowchart of an embodiment of a process for processing traffic monitoring data and application runtime data.

FIG. 18 is a flowchart of an embodiment of a process for processing traffic monitoring data and application runtime data. In one embodiment, the flowchart of FIG. 18 provides more detail of step 1750 of FIG. 17. First, the scope of the functionality tested by the traffic monitoring data and application runtime data is determined at step 1810. In one embodiment, this begins with receiving and aggregating data associated with the traffic and applications being monitored. The traffic monitoring data received from transaction server 164 is aggregated and the application runtime data received from Enterprise Manager 155 is aggregated. In some embodiments, the traffic monitoring data and the application runtime data are already in aggregated form. The traffic monitoring data may include a list of different URLs contained in a request received by web server 140 and an indication regarding how many times each URL was requested. The application runtime data may include data regarding different EJBs, servlets, and other application components that were called and how often each application component was called. The received lists of URLs and application components indicate the functionality that was tested by the received traffic. The received traffic monitoring data and application runtime data is then compared to a stored list of functions (for example, a stored list of URLs and a stored list of application components) to determine the scope of the functionality tested by the traffic. The scope can be determined as the range of possible functionality of the web service or network system that was actually tested by the traffic and application components.

The list of functions used in step 1810 may be generated in several ways. In one embodiment, the list may be generated by the previous functionality monitored. In this case, synthetic transaction generator 172 would maintain a list of functions as it received traffic monitoring data and application runtime data. As data for a new function was received, the new function would be added to the functions list. In some embodiments, the functions list may be generated by an administrator or some other source. In any case, the generated functions list is accessible to synthetic transaction generator 172. Synthetic transaction generator 172 could then access the list when performing step 1810 of FIG. 18.

After determining the scope of functionality tested at step 1810, the frequency of the functionality tested is determined at step 1820. In this case, each time a function is tested, a count associated with the function would be incremented in a list, table or other record. The count for each function in the list can be read after a predetermined period of time to determine how often the functionality was performed for actual traffic. After determining the frequency of tested functions, synthetic transaction generator 172 compares the actual traffic scope and frequency to the target scope and frequency at step 1830. The target scope and frequency of the traffic may be set by administrators, service level agreements or other sources. An example of the target traffic scope and frequency is discussed below with respect to FIG. 19. Comparison of actual traffic scope and frequency to target traffic scope and frequency is discussed in more detail below with respect to steps 2010-2040 of the process of FIG. 20.

Synthetic transaction instructions are generated based on the comparison of traffic monitoring data from real traffic and application runtime data to target traffic monitoring data and application runtime data at step 1840. In this case, synthetic transactions are generated to test blindness and functionality of the system based on the functions tested and the system's current traffic load, as well as for other reasons. Generating synthetic transaction instructions based on a comparison of actual data to target data is discussed in more detail below with respect to steps 2050-2070 of the process of FIG. 20.

After generating synthetic transaction instructions, synthetic transactions are sent to a network system based on the synthetic transaction instructions and network system load at step 1850. The pool of potential synthetic transaction instructions to send as actual transactions includes those generated at step 1840. The actual synthetic transactions sent may vary based on the level of traffic currently experienced by the network system. For example, if the network system is experiencing a low level of load, more or all of the instructions may be executed to send all the instructions. If a high level of traffic load is currently experienced, then fewer instructions may be executed. Sending synthetic transactions to a network system based on the synthetic transaction instructions and network system load is discussed in more detail below with respect to the process of FIG. 23.

FIG. 19 is an example of target data for the scope and frequency of transactions for a web service. The target data is contained in a table that includes seven columns. The actual data listed in the table is symbolic data shown for purposes of illustration, and is not meant to limit the scope of the present technology.

The first column of the table of FIG. 19 has a heading of "Functional Area/Transaction." The functional area or transaction (e.g., a URL) may be associated with retrieved traffic monitoring data and application runtime data. The retrieved data is compared with the target data in the table. The functional areas listed in the table include "stock buy," "shop cart," and "home." The second column entitled "URL" lists a URL associated with each functional area or transaction. The URL is used to match target data in the table to the actual data received from monitoring. The pseudo URLs listed in the table are "www.example.com/stockbuy," "www.example.com/shopcart," and "www.example.com/home."

The third column, entitled "backend," indicates any backend servers accessed for each transaction. In particular, the backend servers associated with a "stock buy" transaction are database (DB) A and application server (AS) A. The backend servers accessed by a "shop cart" transaction are database B and application server B. No backend servers are accessed in a home transaction. It is understood that the backend servers listed in the second column are for discussion purposes only, and are not to be associated with actual servers or other machines of FIG. 14 or 15. The fourth column in the table indicates an agitator number. In one embodiment, each listed agitator may be configured to provide a load to the indicated application server or backend server (or other servers not listed in the exemplary table in FIG. 19) associated with the listed function.

The last three columns of the table of FIG. 19 provide target data for each transaction. In particular, the target data is expressed as transactions per minute for a web server (WS), application server (AS) and database (DB) server for each functional area. The web server targets are listed as 1000, 10, 1000 transactions (T) per minute for a "stock buy," "shop cart," and "home" transaction, respectively. The application server targets are listed as 1000, 10 and 0 transactions per minute, respectively, for the three transactions. The database targets are listed as 0, 10 and 0 transactions per minute for the transactions.

In one embodiment, the target scope and frequency values may be stored as a relational map, such as relational map 1630 of FIG. 16. In this case, logic code 1620 of synthetic transaction generator 172 may access the relational map to retrieve the target scope and frequency data. The retrieved target scope and frequency data can then be compared to the actual traffic monitoring data and application runtime data received from the monitored system.

Figure 20:
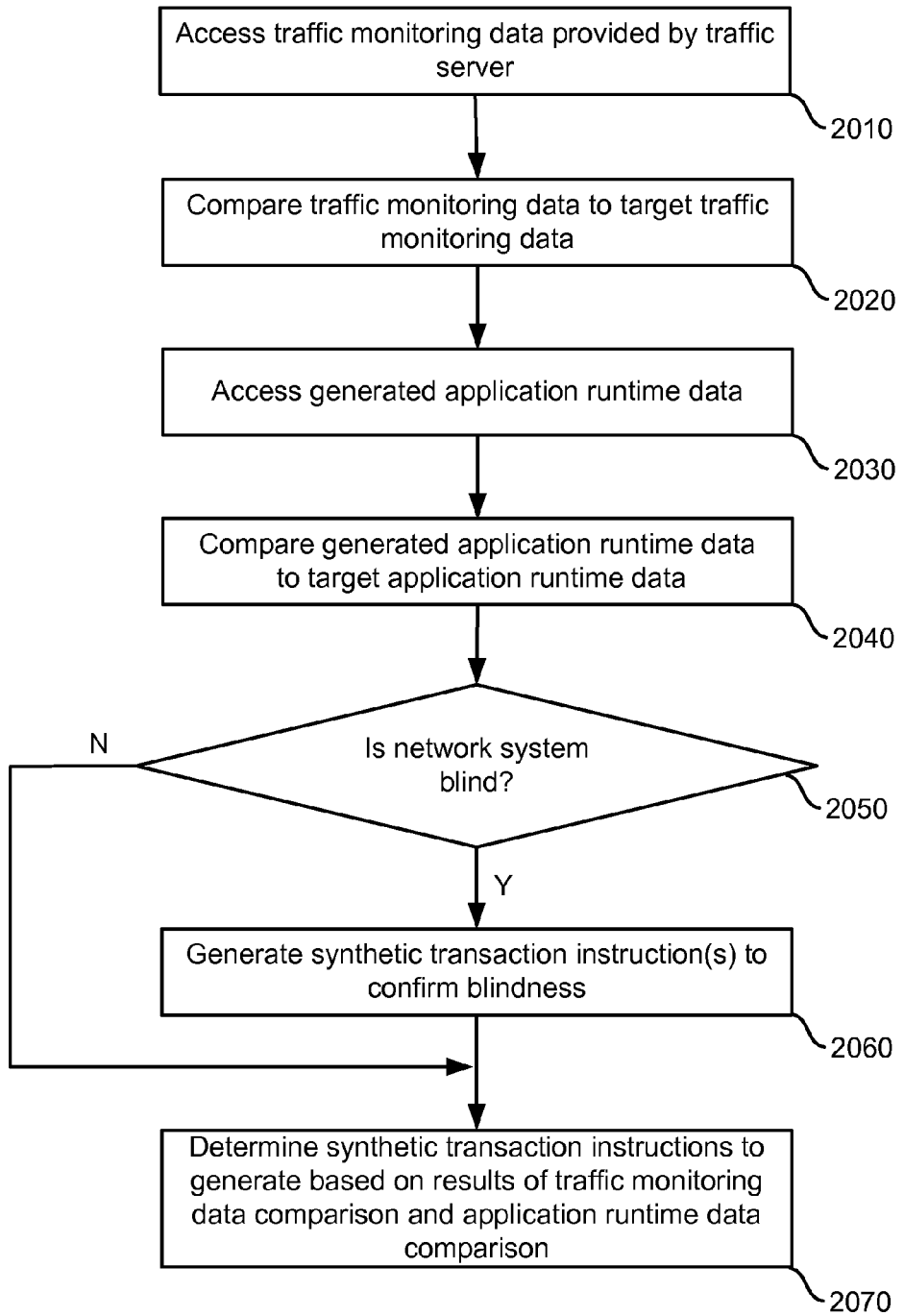
FIG. 20 is a flowchart of an embodiment of a process for generating synthetic transaction instructions based on a comparison of actual traffic monitoring data and application runtime data to target data.

FIG. 20 is a process for generating synthetic transaction instructions based on a comparison of actual traffic monitoring data and application runtime data to target data. In one embodiment, steps 2010-2040 provide more detail for step 1830 of the process of FIG. 18 and steps 2050-2070 provide more detail for step 1840 of the process of FIG. 18. The process of FIG. 20 is performed by logic code 1620 of the system of FIG. 16.

Traffic monitoring data provided by traffic server 164 is accessed at step 2010. The traffic monitoring data may be accessed from traffic server 164 or from local memory if it has already received from traffic server 164. As discussed above, the traffic monitoring data may include defect and statistics data derived from monitored traffic. Next, the traffic monitoring data is compared to target traffic monitoring data at step 2020. An example of the target traffic monitoring data is depicted in the table of FIG. 19. The target traffic monitoring data may be accessed from relational map 1630 or some other memory store. Comparing the traffic monitoring data to the target traffic monitoring data may include determining whether each URL in the target traffic monitoring data has been tested by actual traffic and whether it has been tested at a desired frequency. The results of the comparison are stored and may be accessed as part of steps 2050-2070 discussed below.

Application runtime data generated by application monitoring system 190 (e.g., agent 152 and enterprise manager 155) is accessed at step 2030. The application runtime data may be accessed from Enterprise Manager 155 or from local memory if the data has already been received. Next, the generated application runtime data is compared to target application runtime data at step 2040. Similar to the comparison of the traffic monitoring data, comparing the generated application runtime data to the target application runtime data may include determining whether each application component (e.g., servlet, EJB, and so on) listed in the target application runtime data has been tested by actual requests received by an application server (such as application server 150) and determining whether the component has been used at a desired frequency. The results of the comparison are stored and may be accessed as part of steps 2050-2070 discussed below.

A determination is made by logic code 1620 as to whether the network system (e.g., the web service system) may be blind at step 2050. The network system may be blind if it is not able to see requests which are sent to the web service. In some embodiments, it may be the monitoring system which is blind, in which case the network system may be able to receive and process requests but the system monitoring the network service is not receiving any data. In any case, the determination may include identifying whether any traffic monitoring data or application runtime data has been received within a period of time. Determining whether a system may be blind is discussed in more detail below with respect to FIG. 21. If the network system and monitoring system(s) are not blind, the process of FIG. 20 continues to step 2070.

If the network system and/or monitoring system(s) may be blind, a synthetic transaction instruction is generated to confirm the blindness at step 2060. The synthetic transaction instruction may instruct the agitator advisor to generate a synthetic instruction for the network system. The generated synthetic instruction may be a request to the network service front-end web server 140 which requires a request be processed by application server 150. Additionally, the instruction may require that the agitator which sends the instruction must confirm receipt of the instruction and/or that the instruction was sent to the network service. The synthetic instruction should be received and processed by the network service and observed by the monitoring system. Thus, the process of FIG. 18 may be performed to confirm if the synthetic transaction was received and properly processed by the system.

Logic code 1620 determines what synthetic transactions instructions to generate based on the results of the comparisons of traffic monitoring data and application runtime data to target data at step 2070. In one embodiment, the synthetic transaction instructions may be generated if a desired traffic type or frequency or application functionality or frequency is not met. Additionally, synthetic transaction instructions may be reduced or stopped based on the load of the service or the performance of the agitator sending the instructions. Determining synthetic transaction instructions to send to a network system based on comparisons to target data is discussed in more detail below with respect to FIG. 22.

As discussed above, it may be desirable to know whether a lack of observed traffic or generated application runtime data is due to the web service not being used, errors in processing received traffic or the monitoring system being "blind" (e.g., not seeing a network system request or activity). The flowchart of FIG. 21 is a process for determining which of these scenarios exists.

Figure 21:
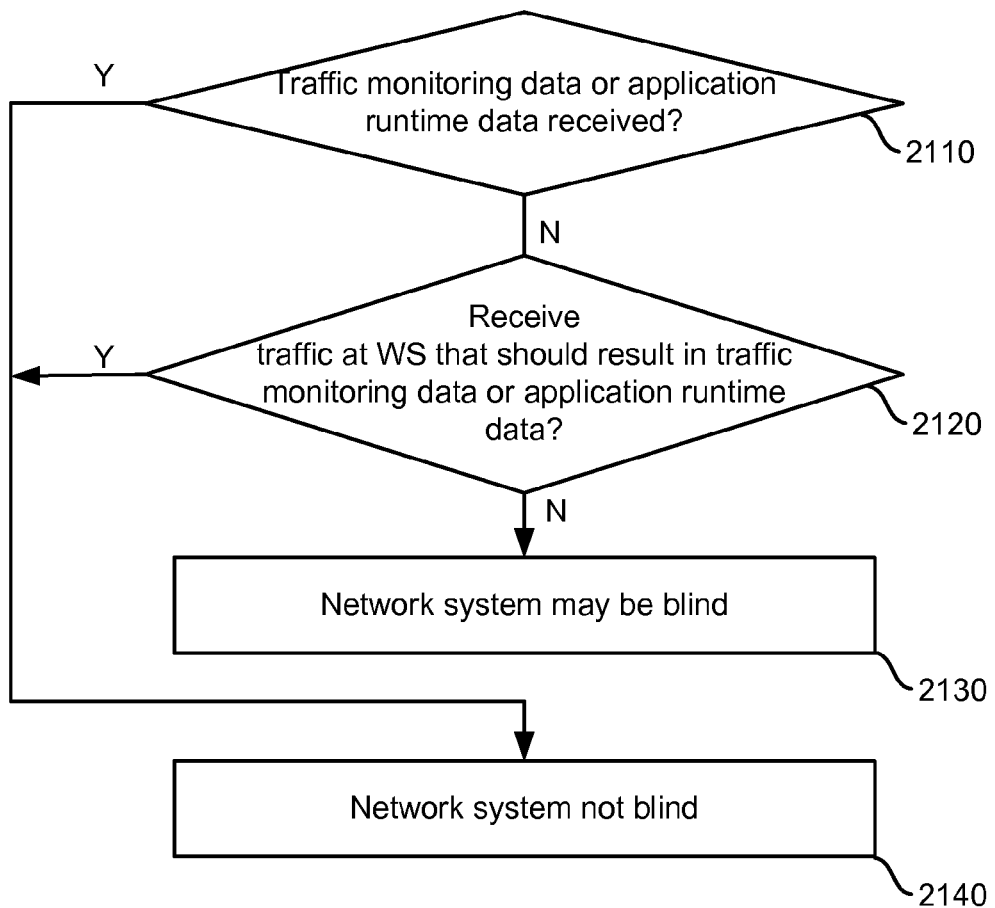
FIG. 21 is a flowchart of an embodiment of a process for comparing actual traffic to target traffic metrics.

FIG. 21 is a flowchart of an embodiment of a process for comparing actual traffic to target traffic metrics. In one embodiment, FIG. 21 provides more detail of step 2050 of the process of FIG. 20. In some embodiments, the process of FIG. 21 may be used to determine blindness of a web service or particular server and/or the current health of a server. The process of FIG. 21 is discussed with respect to application server 150, but may be applied to any server of a system being monitored. A general discussion of the process of FIG. 21 as it relates to step 2050 and determining health of a server is presented below. Application of the process to determining blindness is discussed after the general discussion.

First, a determination is made as to whether traffic, traffic monitoring data or application runtime data is received for application server 150. The determination may include identifying whether traffic monitoring data or application runtime data is received for a period of time by synthetic transaction generator 172 from transaction server 164 or Enterprise Manger 155. If both traffic monitoring data and application runtime data are not received for application server 150, it may be because there is no traffic received by the web service, there is an error in observing the traffic or an error in processing the received traffic by application server 150. In any case, if both traffic monitoring data and application runtime data are not received at step 2110, the flowchart of FIG. 21 continues to step 2120. If traffic or application runtime data is received for application server 150, the flowchart of FIG. 21 continues to step 2140 where the network system is determined to not be blind.

A determination is made at step 2120 as to whether traffic is received at web server 140 that should result in traffic or a transaction at application server 150. If no traffic was received at web server 140 that should result in traffic or a transaction being performed at application server 150, the lack of monitored activity at the servers behind the web server may be due to no traffic being received by web server 140. However, it may not be known whether the no web service traffic was sent or the web server is unable to process requests. Thus, if a determination is made that no web service traffic is received at step 2120, the process of FIG. 21 continues to step 2130 where the determination is made that the system may be blind. If traffic has been received by web server 140 that should result in traffic or a transaction at application server 150, a determination is made that the monitoring system and web server are not blind at step 2140. In this case, an instruction may be generated as discussed above at step 2060 to test web server 140 and application server 150. Put another way, a "test transaction" is generated that should be received by web server 140, causing the server to send a message to application server 150. Web server 140 and application server 150 can be monitored to confirm they receive and process the test transaction. If no traffic or application runtime data is detected for the generated test transaction, the error may be logged, and an alert or notification may be generated for an administrator.

The process of FIG. 21 may be implemented to determine blindness for a web service or a particular server. Blindness may occur if a web service system or particular server is not seeing any traffic or requests, but it is unknown if the lack of traffic is due to inactivity or a server malfunction. In some cases, the monitoring system itself may also be potentially blind. To address the possibility of system blindness, the monitoring system may determine that traffic has not been detected for web server 140 at step 2120. The monitoring system may not have detected traffic for some period of time, such as five minutes, thirty minutes, an hour, or some other time period. After determining that traffic is not received at web server 140, a synthetic transaction may be generated and sent to a web server 140 at step 2060 of the process of FIG. 20. In some embodiments, agitator 1510 may send a confirmation signal back that it received the instruction and/or that it sent the synthetic instruction to web server 140. Monitor 1410 may then determine if the instruction was received. If not, then there may be an error in monitor 1410. If monitor 1410 does receive the instruction but web server 140 does not process the instruction (for example, does not attempt to access application server 150), then web server 140 may be malfunctioning. If monitor 1410 receives the instruction and web server 140 processes the instruction correctly, then the low level of detected traffic is attributed to a low activity time period.

Figure 22:
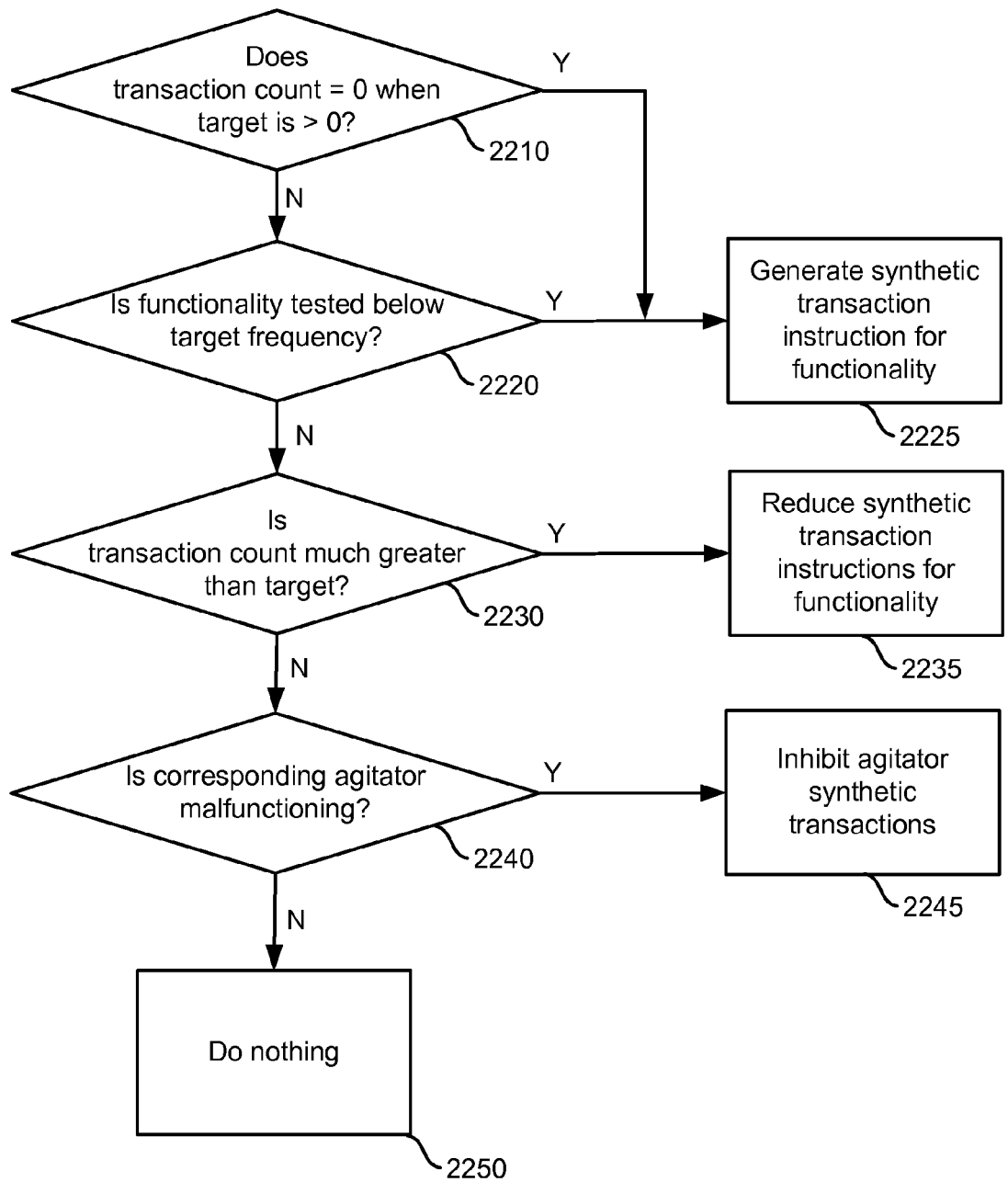
FIG. 22 is a flowchart of an embodiment of a process for generating synthetic transaction instructions in response to comparisons of traffic monitoring data and application runtime data with target data.

FIG. 22 is a flowchart of an embodiment of a process for generating synthetic transaction instructions in response to comparisons of traffic monitoring data and application runtime data with target data. In one embodiment, the process of FIG. 22 provides more detail for step 2070 of FIG. 20. In one embodiment, the process of FIG. 22 is performed by a series of logic statements which may be carried out by logic code 1620 of the system of FIG. 16. The logic may be carried out for each comparison involving target data. In some embodiments, additional logic statements may be performed as steps of the process of FIG. 22

First, a determination is made as to whether any transaction count equals zero when the count should be greater than zero. For example, in the table of FIG. 19, if no transactions were received by any server for a "shop cart" transaction, the system may generate a "shop cart" transaction to confirm that the web server, application server and database server all process the transaction. Similarly, logic code 1620 may determine whether a URL for a "select book" transaction is not received in a request at all over a period of time while the target for the period of time is a number or requests greater than zero. Alternatively, logic code 1620 may determine whether an EJB which retrieves a list of available book data from database server 151 is not invoked at all while the target for the period of time is a number of invocations greater than zero. If the count is determined to be zero when it should be greater than zero, synthetic transaction instructions are generated for the functionality at step 2225. For example, a synthetic transaction instruction may be generated that, when executed, will result in a request to select a book, invoke an EJB to retrieve a list of available book data from database server 151, or test whatever other function was at issue in the particular comparison. If a determination is made that the count is not zero when it should be greater than zero, the process continues to step 2220.

A determination is made as to whether a functionality is tested below a target frequency at step 2220. In the examples discussed above, though the count may not be zero, the number of times a URL is requested or that an EJB or other application component is invoked may be less than the target number of invocations. If the count is less than the target, synthetic transaction instructions are generated for the functionality at step 2225. The quantity of synthetic transaction instructions generated may depend on the disparity between the actual count and the target count. In some embodiments, a priority may be assigned to synthetic transaction instructions. In this case, a priority assigned to the instructions may be lower if the disparity is small (e.g., the actual count is ninety percent of the target count) as opposed to if the disparity is large (e.g., the actual count is fifty percent of the target count). If a determination is made that the tested count is not below the target count, the process continues to step 2230.

A determination is made as to whether any transaction count is much larger than the target count at step 2230. This logic statement determines whether an application is currently being overloaded by a traffic load which is greater than expected. For example, the measured number of requests or application components may exceed the corresponding target count. If the transaction count is greater than the target count, the number of synthetic transaction instructions is reduced at step 2235. If an application or server is currently being overloaded, the agitator associated with that server is instructed to decrease, otherwise reduce, or end the synthetic transactions sent to that application or server. For example, if the "shop cart" transaction has received five hundred transactions in the period during which it expected to receive ten transactions, instructions to cease synthetic transactions may be sent to agitators in communication with the servers handling "shop cart" transactions. If the transaction count is not greater than the target count, the process of FIG. 22 continues to step 2240.

A determination is made as to whether an agitator is malfunctioning at step 2240. If an agitator is detected or suspected to be malfunctioning or otherwise operate improperly, synthetic transaction generator 172 may instruct the agitator to not send any further instructions at step 2245. In this case, it is preferable to have an agitator not send any transactions to ensure that transactions are not sent at the wrong time. For example, an agitator may be able to signal back to synthetic transaction generator 172 upon receiving instructions to send synthetic transactions to a server. The signal sent from the agitator(s) to synthetic transaction generator 172 may indicate a confirmation that the instructions were received, a confirmation the instructions were completed, or some other message. In some embodiments, each agitator may be able to return a "ping" from synthetic transaction generator 172, indicating that the agitator is online and working properly. In these embodiments, the agitator may be determined to be malfunctioning if it does not return a "ping" message or does not respond to agitator advisor 1640 as expected in response to instructions to generate synthetic transactions. If an agitator is determined not to be malfunctioning or otherwise operate improperly, the process of FIG. 22 ends at step 2250.

In some embodiments, generated synthetic transactions may be assigned a priority level. In this case, determining what priority of transaction to send may depend on the traffic load experienced by a system. Priority levels may include high, medium, low, and/or other levels. For example, a high priority level may indicate that the corresponding synthetic transactions should be sent as soon as possible regardless of traffic load. Other synthetic transactions may be assigned a low priority, indicating that the transactions can be sent whenever it is convenient during a low traffic load period. Sending transactions with a medium priority level may not be as urgent as sending high priority transactions, but is more urgent than sending low priority transactions.

Figure 23:
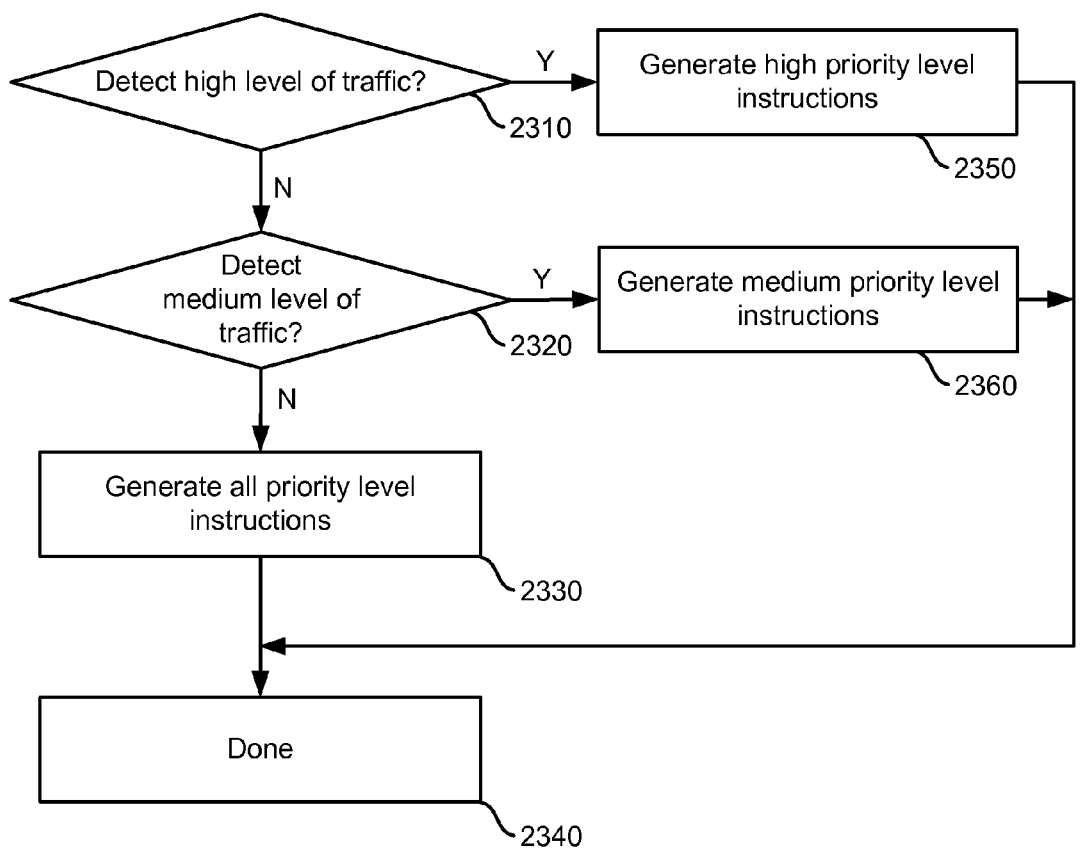
FIG. 23 is a flowchart of an embodiment of a process for generating synthetic traffic based on traffic load and synthetic transaction instructions.

FIG. 23 is a flowchart of an embodiment of a process for generating synthetic traffic based on traffic load and synthetic transaction instructions. In one embodiment, the flowchart of FIG. 23 provides more detail of step 1850 of FIG. 18. First, a determination is made as to whether a high level of traffic is detected at step 2310. With respect to web server 140, a high level of traffic may be detected if traffic monitor 1410 intercepts a high level of traffic to synthetic transaction generator 172 through traffic monitor 160 and transaction server 164. A threshold for a high level of traffic may be determined based on the capacity of the network system, administrator preference, the time of day, network service traffic history, and other factors. If a high level of traffic is currently detected for web server 140, high priority level synthetic transaction instructions may be generated and sent to one or more agitators at step 2350. As discussed above, high priority level synthetic transaction instructions are synthetic transaction instructions that should be sent as soon as possible regardless of the level of traffic load. An example of a high level synthetic transaction instruction may be a request for the home page of the web service. In this case, medium, synthetic transaction instructions having low or any other level of priority below high may not be sent at the time of step 2350. After receiving the high priority level instructions from agitator advisor 1640, each agitator executes the synthetic transaction instructions to send corresponding synthetic transactions, as discussed in more detail below. The flowchart of FIG. 23 ends at step 2340.

If a high level of traffic is not detected, a determination is made as to whether a medium level of traffic is detected at step 2320. As discussed above, the level of traffic is determined from traffic observed by monitor 1410 and processed by traffic monitor 160 and transaction server 164. A medium level of traffic may be set as a percentage range of a high level traffic threshold, a traffic range level set by an administrator, or other means. As discussed above with respect to a high level of traffic, the medium level of traffic may be also be based on capacity of the network system, administrator preference, the time of day, network service traffic history, and other factors. If a medium level of traffic is detected, medium level priority synthetic transaction instructions are generated at step 2360. Examples of medium level priority synthetic transaction instructions are those instructions that test functionality that did not meet target data, but did not miss the target by an amount that is cause for concern. After generating the medium priority level synthetic transaction instructions, each agitator receives the synthetic transaction instructions from agitator advisor 1640 and executes the instructions to send corresponding synthetic transactions to the appropriate server, as discussed in more detail below. The flowchart of FIG. 23 continues to step 2340 where the flowchart ends.

If a medium level of traffic is not detected at step 2320, the level of traffic is determined to be low and it is safe to send all generated synthetic transaction instructions to corresponding agitators. In this case, synthetic transaction instructions associated with all synthetic transaction are and sent to agitators by agitator advisor 1640 at step 2330. Each agitator receives the synthetic transaction instruction and executes the instructions.

Execution of the instruction by one or more of agitators 1510, 1512 and 1514 results in one or more synthetic transactions being sent to a server configured to receive a synthetic transaction from the corresponding agitator. The agitator may send the instruction immediately, at a designated time, or at a designated frequency as indicated in the received synthetic transaction instruction or the configuration of the agitator. In some embodiments, an agitator may send a message to agitator advisor 1640 to confirm receipt of the instruction, to confirm the agitator is online and working properly, or to confirm that synthetic transactions corresponding to the synthetic transaction instructions were sent. The flowchart of FIG. 23 then ends at step 2340.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for generating synthetic transactions in a network system, comprising the computer-implemented steps of:
   monitoring traffic between at least one client device and at least one server device in the network system, the monitored traffic includes incoming traffic to the at least one server device from the at least one client device, the monitored traffic is monitored at an intermediate point in a route traversed by the monitored traffic, and the intermediate point is between the at least one server device and a firewall which protects the at least one server device;
   determining a functionality of the network system which is tested by the monitored traffic by:
      receiving data associated with the monitored traffic;
      from the received data, determining processing which is performed by one or more applications at the at least one server device in response to the incoming traffic; and
      integrating traffic monitoring data and application runtime data, the traffic monitoring data is derived from the monitored traffic and the application runtime data is retrieved from the one or more applications;
   comparing a scope of the functionality to at least one target metric;
   determining a current load experienced by the network system; and
   generating a synthetic transaction which includes a request to the at least one server device, based on the comparing and the current load, the request is separate from the incoming traffic to the at least one server device from the at least one client device.

2. The method of claim 1, wherein the intermediate point comprises a router or switch between the at least one server device and the firewall.

3. The method of claim 2, wherein:
   the incoming traffic is analyzed by the firewall to determine if the incoming traffic is safe before the incoming traffic is sent from the firewall toward the at least one server device.

4. The method of claim 1, wherein said determining the functionality includes:
   determining a number of times a uniform resource locator is contained in requests received by the at least one server device from the at least one client device, where the synthetic transaction is generated based on a comparison of the number of times with a target level.

5. The method of claim 1, wherein said determining the functionality includes:
   determining a number of times an application component of the one or more applications is used to process a portion of the monitored traffic, where the synthetic transaction is generated based on a comparison of the number of times with a target level.

6. The method of claim 1, wherein said determining the functionality includes:
   determining a frequency with which a uniform resource locator is contained in requests received by the at least one server device from the at least one client device, where the synthetic transaction is generated based on a comparison of the frequency with a target level.

7. The method of claim 1, wherein said determining the functionality includes:
   determining a frequency with which an application component of the one or more applications is invoked by the monitored traffic, where the synthetic transaction is generated based on a comparison of the frequency with a target level.

8. The method of claim 7, wherein the determining the functionality comprises:
   determining a frequency of a transaction tested by the monitored traffic.

9. The method of claim 1, further comprising:
   generating another synthetic transaction which includes a request to the at least one server device based on a functionality of the network system that has not been tested by the monitored traffic.

10. The method of claim 1, wherein:
    the request is sent to the at least one server device by an agitator device connected to the at least one server device, the agitator device is separate from the at least one client device.

11. The method of claim 1, wherein:
    the generating comprises generating one synthetic transaction which includes one request to one server device, and generating another synthetic transaction which includes another request to another server device; and
    the one server device is arranged between the another server device and a firewall which protects the one server device and the another service device.

12. The method of claim 11, wherein:
    the one synthetic transaction is generated by one agitator device connected to the one server device, and the another synthetic transaction is generated by another agitator device connected to the another server device, the agitator devices are separate from the at least one client device.

13. An apparatus for processing data, comprising:
    a communication interface;
    a storage device; and
    one or more processors in communication with said storage device and said communication interface, said one or more processors:
       determine a functionality of a network system, the functionality is tested by traffic received by the network system at an intermediate point in a route traversed by the traffic, the intermediate point is between one or more application servers and a firewall which protects the one or more application servers, the monitored traffic includes incoming traffic from at least one client device, and said one or more processors, to determine the functionality:
          receive data associated with the monitored traffic, from the received data, determine processing which is performed by one or more applications at the one or more application servers in response to the incoming traffic, and integrate traffic monitoring data and application runtime data, the traffic monitoring data is derived from the monitored traffic and the application runtime data is retrieved from the one or more applications, and in a comparison, compare a scope of the functionality to at least one target metric, determine a load of the network system, and generate synthetic transaction instructions, separate from the incoming traffic, based on the comparison and the load.

14. The apparatus of claim 13, wherein said one or more processors, in the comparison, compare HTTP information in the monitored traffic to target HTTP information.

15. The apparatus of claim 14, wherein the scope of the functionality is based on a list of requested uniform resource locators.

16. The apparatus of claim 13, wherein the functionality of the network system comprises a functionality of the one or more application servers, and to generate the synthetic transaction instructions, the one or more processors:

identify one or more agitators associated with the one or more application servers, and separate from the at least one client device; and generate instructions for each of the one or more agitators which cause the one or more agitators to generate synthetic transactions which include requests to the at least one application server.

17. The apparatus of claim 13, wherein:

the one or more processors send the synthetic transaction instructions to an agitator device connected to the one or more application servers, the agitator device is separate from the at least one client device.

18. The apparatus of claim 17, wherein:

the agitator device sends a request to the one or more application servers in response to the synthetic transaction instructions, the request is separate from the incoming traffic to the one or more application servers from the at least one client device.

19. One or more tangible processor-readable storage devices having processor readable code embodied thereon for programming one or more processors to perform a method for processing data, the method comprising:

(a) determining a functionality of a network system, the functionality is tested by monitored traffic received by the network system at an intermediate point in a route traversed by the monitored traffic, the intermediate point is between one or more application servers and a firewall which protects the one or more application servers, and the monitored traffic includes incoming traffic from at least one client device, the determining the functionality comprising:

receiving data associated with the monitored traffic, from the received data, determining processing which is performed by one or more applications at the one or more application servers in response to the incoming traffic, and integrating traffic monitoring data and application runtime data, the traffic monitoring data is derived from the monitored traffic and the application runtime data is retrieved from the one or more applications, (b) comparing a scope of the functionality to at least one target metric, (c) determining a load of the network system, and (d) generating synthetic transaction instructions, separate from the incoming traffic, based on the comparing and the load.

20. The one or more tangible processor-readable storage devices of claim 19, wherein:

the load of the network system comprises a load of the one or more applications.

21. The one or more tangible processor-readable storage devices of claim 19, wherein:

the load of the network system comprises a load of the one or more application servers.

22. The one or more tangible processor-readable storage devices of claim 19, wherein:

the load of the network system comprises a rate of requests at the one or more application servers.

23. The one or more tangible processor-readable storage devices of claim 19, wherein:

the load of the network system comprises a rate at which Enterprise Java Beans are called at the one or more application servers.

24. One or more tangible processor-readable storage devices having processor readable code embodied thereon for programming one or more processors to perform a method for generating synthetic transactions in a network system, the method comprising:

monitoring traffic between at least one client device and at least one server device in the network system, the monitored traffic includes incoming traffic to the at least one server device from the at least one client device, the monitored traffic is monitored at an intermediate point in a route traversed by the monitored traffic, and the intermediate point is between the at least one server device and a firewall which protects the at least one server device;

determining a functionality of the network system which is tested by the monitored traffic by:

receiving data associated with the monitored traffic;

from the received data, determining processing which is performed by one or more applications at the at least one server device in response to the incoming traffic; and integrating traffic monitoring data and application runtime data, the traffic monitoring data is derived from the monitored traffic and the application runtime data is retrieved from the one or more applications;

comparing a scope of the functionality to at least one target metric;

determining a current load experienced by the network system; and generating a synthetic transaction which includes a request to the at least one server device, based on the comparing and the current load, the request is separate from the incoming traffic to the at least one server device from the at least one client device.

25. The one or more tangible processor-readable storage devices of claim 24, wherein:

the load comprises a load of the one or more applications.

26. The one or more tangible processor-readable storage devices of claim 24, wherein:

the load comprises a load of the at least one server device.

27. The one or more tangible processor-readable storage devices of claim 24, wherein:

the load comprises a rate of requests at the one or more applications.

28. The one or more tangible processor-readable storage devices of claim 24, wherein:

the load comprises a rate at which Enterprise Java Beans are called at the one or more applications.

29. The one or more tangible processor-readable storage devices of claim 24, wherein:
the intermediate point comprises a router or switch between the at least one server device and the firewall.

30. The one or more tangible processor-readable storage devices of claim 24, wherein said determining the functionality includes:
determining a number of times a uniform resource locator is contained in requests received by the at least one server device from the at least one client device, where the synthetic transaction is generated based on a comparison of the number of times with a target level.

31. The one or more tangible processor-readable storage devices of claim 24, wherein said determining the functionality includes:
determining a number of times an application component of the one or more applications is used to process a portion of the monitored traffic, where the synthetic transaction is generated based on a comparison of the number of times with a target level.

32. The one or more tangible processor-readable storage devices of claim 24, wherein said determining the functionality includes:
determining a frequency with which a uniform resource locator is contained in requests received by the at least one server device from the at least one client device, where the synthetic transaction is generated based on a comparison of the frequency with a target level.

33. The one or more tangible processor-readable storage devices of claim 24, wherein said determining the functionality includes:
determining a frequency with which an application component of the one or more applications is invoked by the monitored traffic, where the synthetic transaction is generated based on a comparison of the frequency with a target level.

34. The one or more tangible processor-readable storage devices of claim 33, wherein the determining the functionality comprises:
determining a frequency of a transaction tested by the monitored traffic.

35. The one or more tangible processor-readable storage devices of claim 24, wherein the method performed further comprises:
generating another synthetic transaction which includes a request to the at least one server device based on a functionality of the network system that has not been tested by the monitored traffic.

* * * * *